United States Patent [19]

Alford

[11] Patent Number: 5,343,441

[45] Date of Patent: * Aug. 30, 1994

[54] MULTISOURCE MULTIRECEIVER METHOD AND SYSTEM FOR GEOPHYSICAL EXPLORATION

[75] Inventor: Richard M. Alford, Broken Arrow, Okla.

[73] Assignee: Amoco Corporation, Chicago, Ill.

[*] Notice: The portion of the term of this patent subsequent to Feb. 7, 2006 has been disclaimed.

[21] Appl. No.: 666,158

[22] Filed: Mar. 7, 1991

Related U.S. Application Data

[63] Continuation of Ser. No. 432,107, Nov. 3, 1989, Pat. No. 5,029,146, which is a continuation of Ser. No. 206,053, Jun. 10, 1988, Pat. No. 4,903,244, which is a continuation of Ser. No. 633,160, Jun. 20, 1984, Pat. No. 4,803,666.

[51] Int. Cl.$^5$ ............................................. G01V 1/00
[52] U.S. Cl. .................................................... 367/75
[58] Field of Search ........................ 367/36, 37, 75, 73; 364/421

[56] References Cited

U.S. PATENT DOCUMENTS

| | | | |
|---|---|---|---|
| 2,658,578 | 11/1953 | Oliphant et al. | |
| 4,106,327 | 8/1978 | Adler et al. | |
| 4,803,666 | 2/1989 | Alford | 367/36 |
| 4,903,244 | 2/1990 | Alford | 367/36 |

FOREIGN PATENT DOCUMENTS 3212357 10/1983 Fed. Rep. of Germany .

OTHER PUBLICATIONS

Crampin et al., "The Variation of Delays in Stress-Induced Anisotropic Polarization Anomalies", Geophys. J.R. arst. Soc. (1981) 64, 115–131.
Keith et al., "Seismic Body Waves in Anisotropic Media: Reflection and Refraction at a Plane Interface", Geophys. J.R. astr. Soc. (1977) 49, 181–208.
Keith et al., "Seismic Body Waves in Anisotropic Media: Synthetic Seismograms", Geophys. J. R. astr. Soc. (1977) 49, 225–243.
Booth et al., "The Anisotropic Reflectivity Technique: Anomalous Reflected Arrivals from an Anisotropic Upper Mantle", Geophy. J.R. astr. Soc. (1983) 72, 767–782.
Booth et al., "The Anisotropic Reflectivity Technique: Theory", Geophys. J.R. astr. Soc. (1983) 72, 755–766.
Crampin, "Seismic Anisotrophy—A Summary", J. Geophysics, (1977) 43, 499–501.
Crampin et al., "Estimating Crack Parameters from Observations of P-Wave Velocity Anisotropy", Geophys. vol. 45, No. 3, (Mar. 1980) 345–360.
Crampin, "Seismic Wave Propagation Through a Cracked Solid: Polarization as a Possible Dilatancy Diagnostic", Geophys. J.R. astr. Soc. (1978) 53, 467–496.
Crampin, "A Review of the Effects of Anisotropic Layering on the Propagation of Seismic Waves", Geophys. J.R. astr. Soc. (1977) 54, 9–27.
Allen et al., "Ultrasonic SH Wave Velocity in Textured Aluminum Plates", Ultrasonics, vol. 23, No. 5, (1985), pp. 215–222.

*Primary Examiner*—Mark Hellner
*Attorney, Agent, or Firm*—James A. Gabala; Richard A. Kretchmer

[57] ABSTRACT

A method and system for geophysical exploration including obtaining, processing, displaying and interpreting seismic data. Seismic energy is imparted into the earth'subterranean formation along at least two linear independent lines of action in a seismic survey. At least two linearly independent components of the seismic wave energy imparted along each line of action are detected within the seismic survey. A concord of seismic signals is produced from the seismic wave energy detected for selected combinations of receiver and source locations. An orientation module operates on the concord of the seismic signals so as to generate synthetic concords of seismic signals so as to focus on a particular component of the seismic wave energy in order to infer the geologic characteristics of the earth's subterranean formations.

6 Claims, 19 Drawing Sheets

SEC. 0.2   0.6   1.0   1.4   1.8   2.2   2.6   3.0   3.4

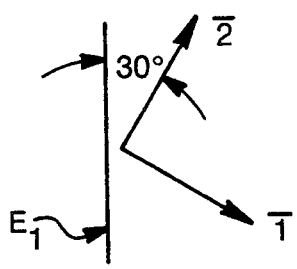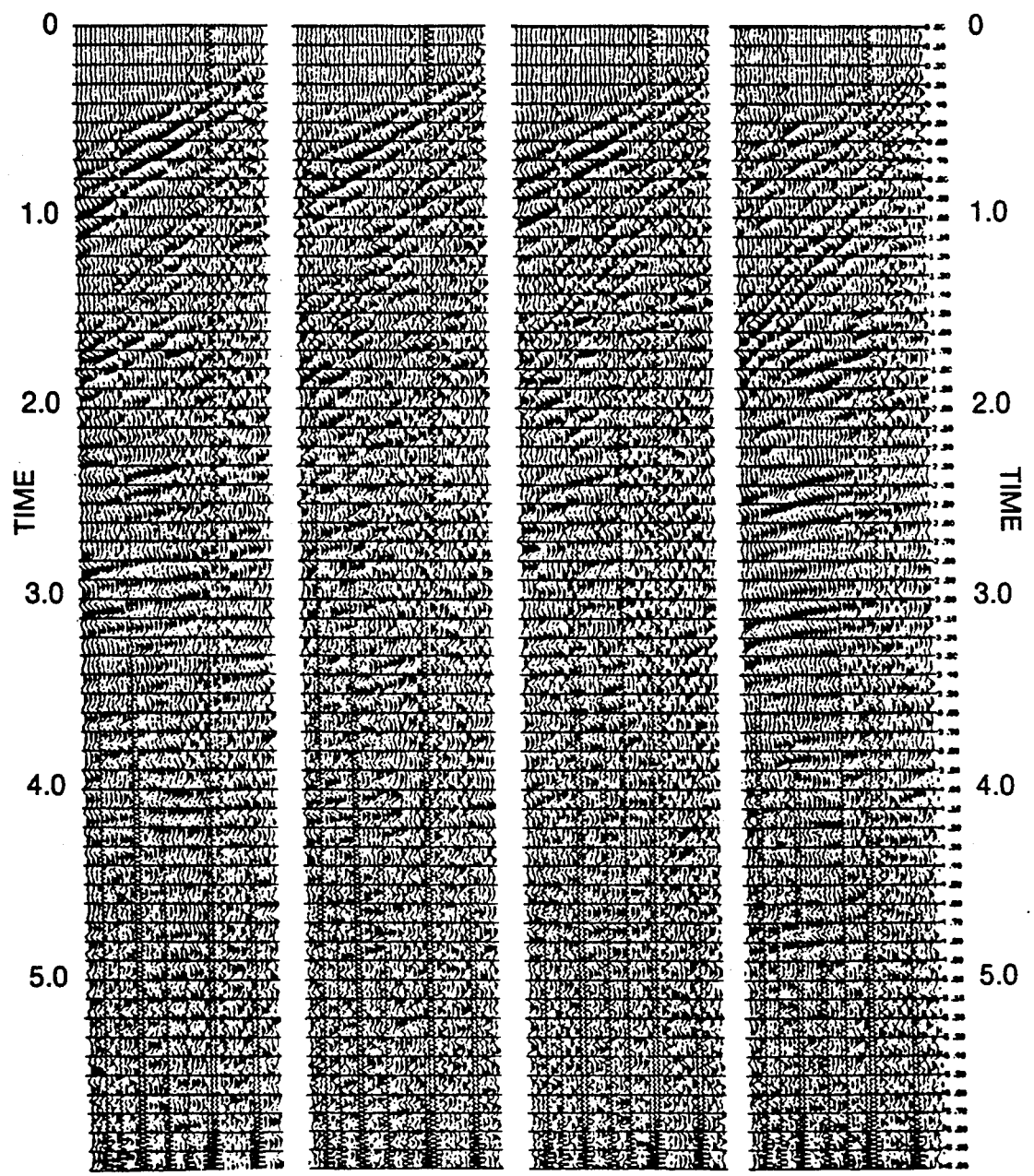
FIG. 16a  FIG. 16b  FIG. 16c  FIG. 16d

MULTISOURCE MULTIRECEIVER METHOD AND SYSTEM FOR GEOPHYSICAL EXPLORATION

This is a continuation of copending application Ser. No. 432,107 filed Nov. 3, 1989 now U.S. Pat. No. 5,029,146; which is a continuation of Ser. No. 206,053 now U.S. Pat. No. 4,903,244 filed Jun. 10, 1988; which is a continuation of Ser. No. 633,160 now U.S. Pat. No. 4,803,666 filed Jun. 20, 1984.

BACKGROUND OF THE INVENTION

The present invention relates generally to the field of geophysical exploration. Specifically, a novel method and system of obtaining, interpreting, processing, and displaying seismic data having improved quality as well as new information concerning the earth's subterranean formations are disclosed. Additionally, an improved shear wave seismic exploration technique is disclosed in which a shear wave seismic survey line of profile can be laid without prior knowledge of or regard for the geological character of the earth's subterranean formations.

Historically, shear wave seismic exploration techniques have employed shear wave seismic sources and shear wave seismic receivers in a seismic survey to gather seismic data. Such a seismic survey has been either linear or areal in its extent. The seismic energy imparted by the shear wave seismic source is detected by the shear wave seismic receivers after interacting with the earth's subterranean formations. Such seismic surveys, however, have been limited to utilizing a shear wave seismic source having a single line of action or polarization, oriented with respect to the seismic survey line of profile, to preferentially generate seismic waves of known orientation, e.g., horizontal shear (Sh) waves or vertical shear (Sv) waves. The shear wave seismic receivers utilized in conjunction with a given shear wave seismic source have similarly been limited to a single line of action or polarization, oriented with respect to the seismic survey line of profile, to preferentially receive a single component of the seismic wave, e.g., (Sh) wave or (Sv) wave. As used herein, the term "line of action" generally comprehends a defined vector displacement, such as the particle motion of the seismic wave. In present shear wave seismic surveys, the lines of action of the seismic source and the seismic receivers have the same orientation relative to the line of profile and are said to be "matched".

As long as seismic surveys were limited to seismic sources and seismic receivers having a compressional (P) wave lines of action, satisfactory results were generally obtained irrespective of the orientation of the seismic survey line of profile with respect to the underlying geological character of the subterranean formations. However, when the seismic sources and seismic receivers are of the shear wave type, i.e., either horizontal shear (Sh) wave or vertical shear (Sv) wave, the orientation of the seismic survey line of profile and/or the line of action of the shear wave seismic source with respect to the geological character of the subterranean formations can determine whether or not meaningful seismic data is obtained.

As understood by those skilled in the art, compressional (P) waves are longitudinal waves where the particle motion is in the direction of propagation. Shear waves are transverse waves where the particle motion is in a transverse plane perpendicular to the direction of propagation. Two special classes of shear waves are defined herein. Specifically, horizontal shear (Sh) waves where the particle motion in the transverse plane is further restricted to be perpendicular to the line of profile of the seismic survey E (i.e., horizontal) and vertical shear (Sv) waves where the particle motion in the transverse plane is further restricted to be perpendicular to the horizontal shear (Sh) particle motion all of which is shown in FIG. 1.

Exemplary of the dependence of the orientation of the seismic survey line of profile with respect to the geological character of the subterranean formation, when matched shear wave seismic sources and shear wave seismic receivers are used, it is known by those skilled in the art that shear wave seismic surveys are adversely affected by azimuthally anisotropic subterranean formations. Azimuthally anisotropic subterranean formations have generally vertical parallel planes of symmetry. Because (Sh) waves and (Sv) waves interact differently with the symmetry planes of the azimuthally anisotropic subterranean formation, especially when the symmetry planes are either parallel to or perpendicular to the line of action of the shear wave, care must be taken to ensure that the seismic survey line of profile is laid out either parallel or perpendicular to the symmetry planes.

When the seismic survey line of profile is laid out either parallel or perpendicular to the symmetry planes, the utilization of matched sets of (Sh) wave and (Sv) wave seismic receivers and seismic sources have been used to demonstrate the anisotropic geological character of a subterranean formation. Such a technique requires prior knowledge of the seismic velocity anisotropy of the of the subterranean formation to be successful.

The interaction differences of (Sh) waves and (Sv) waves have been utilized to detect and measure the anisotropic properties of an azimuthally anisotropic subterranean formation when the seismic lines of profile are properly oriented with respect to the surfaces of the symmetry planes and matched sets of shear wave seismic sources and shear wave seismic receivers have been deployed in the seismic survey. In such applications, (Sh) and (Sv) shear wave seismic sources and seismic receivers are utilized, but only in matched sets, i.e., (Sh) shear wave seismic sources with (Sh) shear wave seismic receivers and (Sv) shear wave seismic sources with (Sv) shear wave seismic receivers.

However, if the seismic survey line of profile is not properly oriented with respect to the planes of symmetry, the seismic information observed can be difficult to interpret at best.

As shown in FIG. 1, the (Sh) wave and (Sv) wave lines of action for the seismic source S and seismic receiver R are defined with respect to the line of profile of the seismic survey E. As such, the orientation of the seismic survey line of profile with respect to the symmetry planes is critical. Consequently, utilization of matched sets of shear wave seismic sources and shear wave seismic receivers have produced inconsistent results when the seismic survey line of profile has not been properly laid out with respect to the anisotropic geological character of the subterranean formations.

Those acquainted with the art of seismic exploration, especially in seismically virgin territory, realize that prior knowledge of the geological character of the subterranean formations is generally not available prior to seismic exploration. The method and system of geophysical exploration of the present invention can be advantageously employed without regard to or knowledge of the geological character of the subterranean formations and still obtain meaningful seismic data.

SUMMARY OF THE INVENTION

The present invention comprises a novel method and system of geophysical exploration utilizing sets of seismic sources and sets of seismic receivers deployed in a seismic survey. The geophysical exploration method includes imparting seismic wave energy into the earth's subterranean formations along at least two linearly independent lines of action and detecting at least two linearly independent components of the seismic wave energy imparted along each line of action in the seismic survey after the seismic energy has interacted with the earth's subterranean formations.

The method can further include forming at least one concord of seismic signals from the components of the seismic wave energy detected and displaying the concord of seismic sections representative of each component of the detected seismic wave energy. The term "linearly independent" as used herein is a mathematical expression used to indicate that information contained in a first line of action cannot be obtained through a linear combination of other lines of action; i.e., the information is not redundant. The method also includes rotating the concords of seismic signals to form synthetic concords of seismic signals and displaying synthetic concords of seismic sections corresponding to the rotation of each component of the concord of seismic wave energy detected.

A seismic survey is laid out without regard for or knowledge of the geological character of the earth's subterranean formations. Elements in a set of seismic sources adapted to impart seismic wave energy into the earth's subterranean formations along at least two linearly independent lines of action are positioned at selected source locations. Elements in a set of seismic receivers adapted to detect at least two linearly independent components of the imparted seismic wave energy are positioned at selected receiver locations.

Each element in the set of the seismic receivers is adapted to generate an electrical signal or trace containing information regarding the geological character of the subterranean formation. An ensemble of such seismic signals is obtained for selected combinations of source locations and receiver locations.

The system further includes an orientation module adapted to generate synthetic concords of seismic signals corresponding to synthetic orientations of the lines of action of the elements in the sets of the seismic sources and elements in the sets of seismic receivers so as to focus on a particular component of the imparted seismic wave energy. A concord of synthetic seismic sections produced from synthesized components of the detected seismic wave energy in the synthetic concord of seismic signals can aid in inferring the geological character of the subterranean formations. The synthetic concords of seismic signals correspond to a synthesized rotation of the lines of action of the elements in the sets of seismic sources and/or the sets of seismic receivers so as to focus on a particular component seismic wave energy. The orientation module is adapted to operate on either an unstacked concord of seismic signals or on a stacked concord of seismic signals.

The synthetic concords of the seismic signals or traces can focus on any one of a plurality of components of the seismic wave energy with respect to the geological character of the subterranean formations and thus provides a method for inferring various features of the subterranean formations.

In one embodiment, a method and system of shear wave geophysical exploration are disclosed utilizing a shear wave seismic source imparting seismic shear wave energy at each source location in the seismic survey along at least two linearly independent lines of action and at least two shear wave seismic receivers at each receiver location in the seismic survey. Each shear wave seismic receiver has linearly independent lines of action adapted to detect a component of the imparted seismic wave energy.

The orientation module has the effect of synthetically rotating the lines of action of the elements within either the set of seismic sources or the set of seismic receivers or both, into new lines of action. The resulting synthetic concords of seismic signals thus appears as if they had been originally acquired with sets of seismic sources and/or sets of seismic receivers having elements with such synthesized new lines of action.

The ability to obtain shear wave seismic data in a given seismic survey with shear wave seismic sources and shear wave seismic receivers having fixed lines of action and thereafter synthetically rotating the lines of action affords a significant improvement in the shear wave seismic data quality as well as the interpretation thereof.

The present invention further includes a method of displaying the concords of seismic signals as a concord of seismic data as well as displaying the synthetic concords of seismic signals as synthetic concords of seismic data. The synthetic seismic data produced from the synthetic concords of seismic signals are generated by the operation of the orientation module so as to focus on different components of the seismic wave energy and to provide a method of interpreting the geological character of the subterranean formation.

BRIEF DESCRIPTION OF THE DRAWINGS

FIG. 15 is a concord of common source point seismic data along line of profile $E_2$;

FIG. 16 is a synthetic concord of common source point seismic data along the line of profile $E_1$.

DETAILED DESCRIPTION OF THE PREFERRED EMBODIMENT

Figure 1:
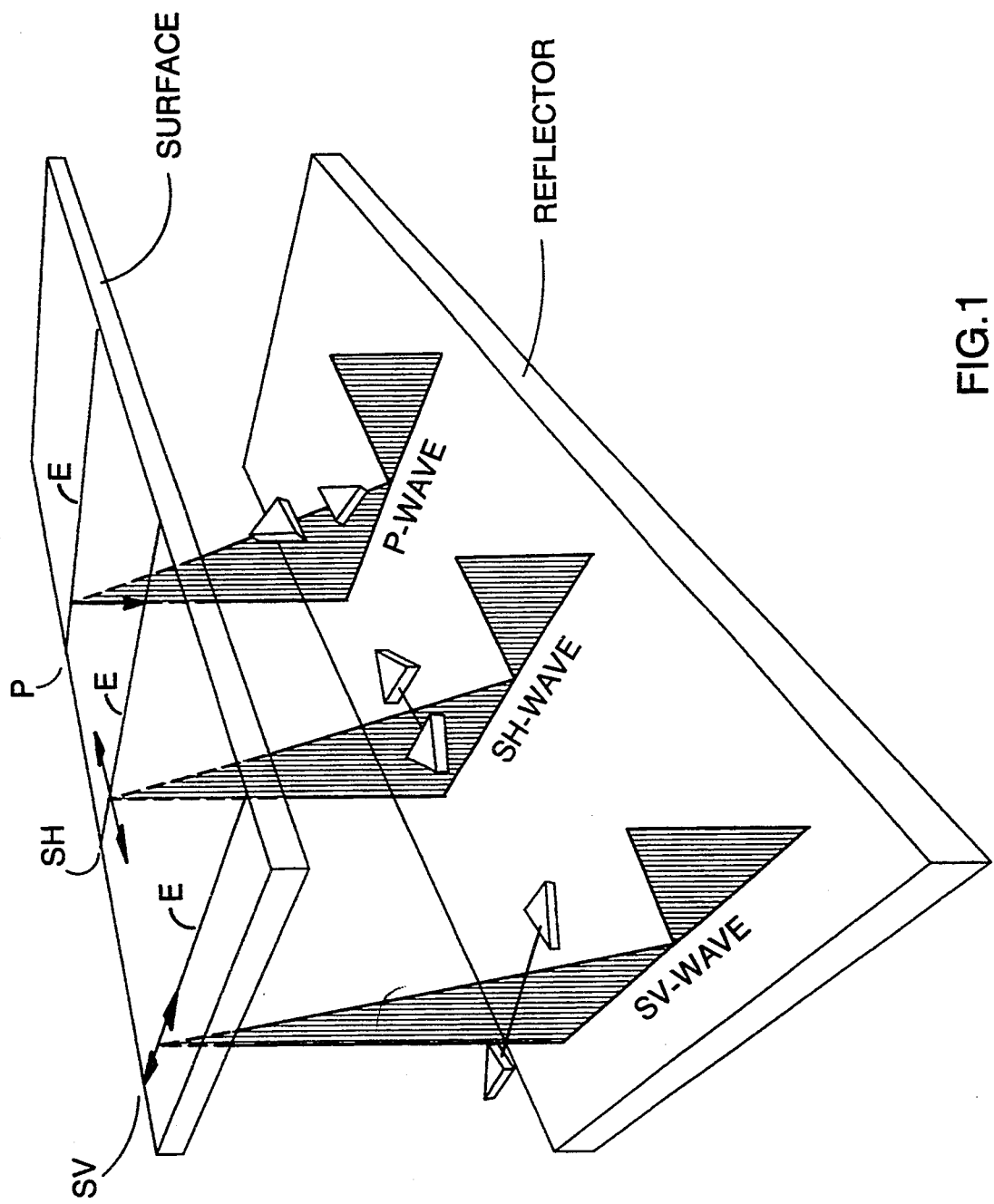
FIG. 1 is a schematic representation defining the relationship between a line of action and a line of profile in a seismic survey.

In order to facilitate a more comprehensive understanding of the present invention, Table I and a brief discussion of the mathematical notation to be utilized are provided.

TABLE I

| | |
|---|---|
| R | is defined as a set of seismic receivers; |
| S | is defined as a set of seismic sources; |
| $R_p$ | is defined as a set of receiver locations in a seismic survey; |
| $S_q$ | is defined as a set of source locations in a seismic survey; |
| E | is defined as a seismic survey either linear or areal in extent; |
| $E_1, E_2, E_3$ | are defined as lines of profile in a seismic survey E: |
| $r_i$ | is defined as an element in the set of seismic receivers R having a specified line of action, the index i is a dummy variable which is replaced by the index c for synthetic lines of action; |
| $s_j$ | is defined as an element in the set of seismic sources S having a specified line of action, the index j is a dummy variable which is replaced by the index m for synthetic lines of action; |
| $\Phi_{ij}$ | is defined as a general collection of seismic signals generated by the receiver elements $r_i$ in response to the seismic energy imparted by the source elements $s_j$; |
| $\Phi_{11}, \Phi_{12}$, etc. | are defined as specific components of the general collection of seismic signals $\Phi_{ij}$ produced with source elements $s_j$ and receiver elements $r_i$ having specified lines of action; |
| K | is defined as a concord for a specific collection of the seismic signals $\Phi_{ij}$ for all indices i and j, having at least two linearly independent lines of action for the receiver elements $r_i$ and at least two linearly independent lines of action for the source elements $s_j$; |
| $(\Phi_{ij})pq$ | is defined as a collection of seismic signals or data generated by imparting seismic wave energy at source locations $S_q$ and detecting seismic wave energy at receiver locations $R_p$, generally, the location indices can be suppressed when source or receiver location information is not relevant; |
| $\beta_{ij}$ | is defined as seismic data resulting from processing the seismic signals $(\Phi_{ij})pq$ to produce stacked seismic signals such as common depth point, common source point, or common receiver point; |
| $\beta_{ij}'$ | is defined as a gather of seismic signals $(\Phi_{ij})pq$ such as CDP, CSP or CRP; |
| | used in conjuction with $\Phi_{ij}$, R, S, $r_i$, and $s_j$ to define a set of seismic sources S and a set of seismic receivers R having elements with lines of action $_j$ and $_i$ physically oriented along proper orientations with respect to the line of profile of the seismic survey to produce seismic signals $\Phi_{ij}$; and |
| | used in conjunction with $\Phi_{cm}$, R, S, $r_c$ and $s_m$ to define a set of seismic sources S and a set of seismic receivers R having elements with lines of action $s_m$ having elements with lines of action $s_m$ and $r_c$ synthetically oriented with respect to the line of profile of the seismic survey to produce synthetic seismic signals $\Phi_{cm}$. |

Figure 2A:
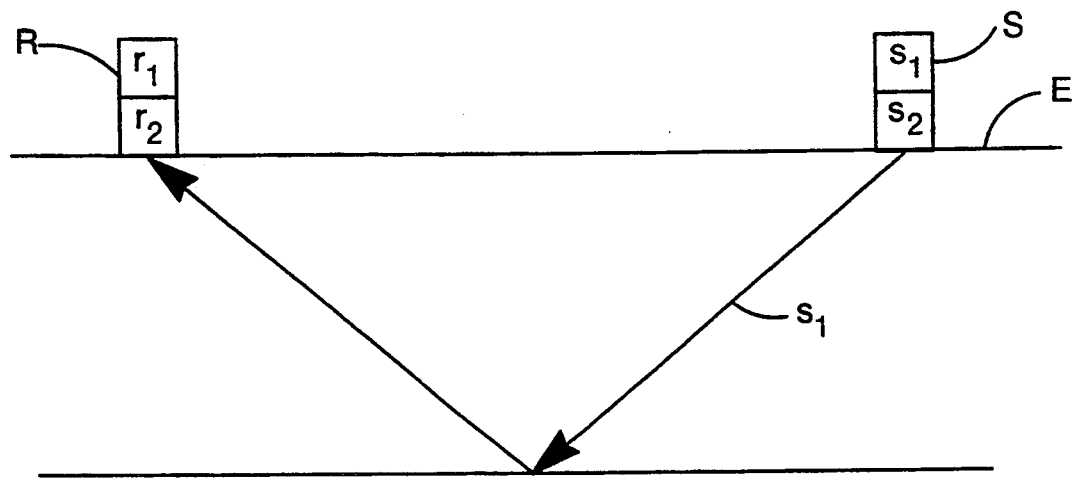
FIGS. 2a-b are schematic examples of the present invention demonstrating the relationship of the lines of action for the elements $r_I$ and $s_j$ for a single set of seismic receivers and seismic sources.

Looking now to FIG. 2a and b, a set of seismic receivers R is located at a specified location in a seismic survey E. Each set of seismic receivers R includes elements adapted to detect a component of the imparted seismic wave energy. The elements in the set of seismic receivers R have linearly independent lines of action $r_1$ and $r_2$. Additionally, a set of seismic sources S is adapted to impart preferred components of seismic wave energy into the earth's formation at a specified location in the seismic survey E. Each set of seismic sources S includes elements adapted to impart seismic energy into the earth along linearly independent lines of action $s_1$ and $s_2$. The elements in the sets of seismic sources S and seismic receivers R are identified by their lines of action and are hereafter generally denoted $s_j$ and $r_i$, respectively. This notation identifies both the element and the line of action of the element.

Upon the independent initiation of each source element $s_j$ in the set of seismic sources S, seismic wave energy having a preferred line of action $s_1$ or $s_2$ is imparted into the earth's formations at the specified location in the seismic survey E. After interacting with the subterranean formation, two components of the seismic wave energy imparted by each source element $s_j$ are detected by the receiver elements $r_i$ in the set of seismic receivers R.

Figure 2B:
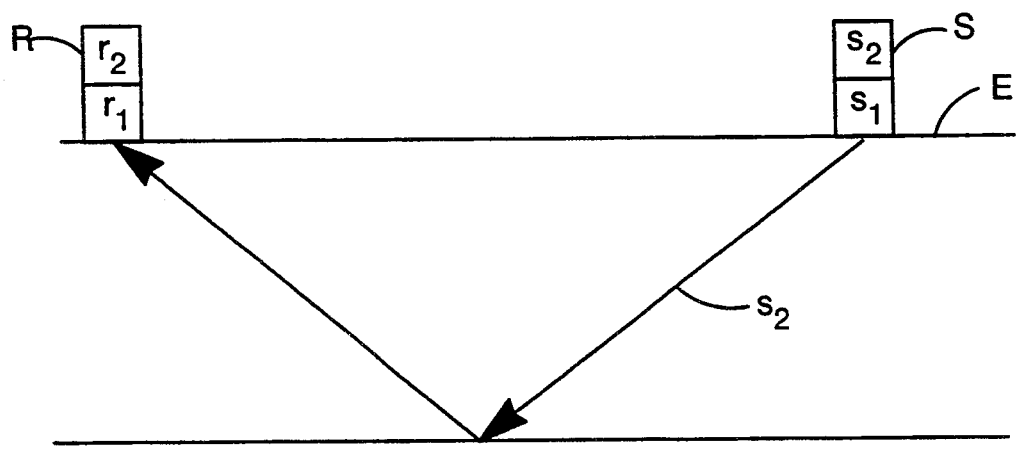

FIGS. 2a and 2b show by way of example, a set of seismic receivers R having elements with lines of action $r_1$ and $r_2$ and a set of seismic sources S imparting seismic wave energy along lines of action $s_1$ and $s_2$. Such configuration is merely by way of example since those skilled in the art will appreciate that typically several sets of seismic sources and seismic receivers can be used simultaneously to obtain the benefits of a spatial array. In this example, the paired lines of actions of $r_1$, $s_1$ and $r_2$, $s_2$ in the set of seismic receivers R and seismic sources S have the same orientation or alignment with respect to the line of profile of the seismic survey E.

FIG. 2a is a schematic representation of the independent initiation of the source element $s_1$ in the set of seismic sources S imparting seismic wave energy into the earth's subterranean formation along the preferred line of action $s_1$ and the measurement of such seismic wave energy with the receiver elements $r_1$ and $r_2$ in the set of seismic receivers R.

FIG. 2b is a schematic representation of the same set of seismic sources S and set of seismic receivers R in FIG. 2a, but shows the independent initiation of source element $s_2$ in the set of seismic sources S imparting seismic wave energy into the earth's subterranean formation along the preferred line of action $s_2$ and the measurement of such seismic wave energy with the receiver elements $r_1$ and $r_2$ in the set of seismic receivers R.

Mathematically, the seismic wave energy detected can be organized in the following matrix form where ($r_i$, $s_j$) represents ordered pairs of the elements $r_i$ and $s_j$ in the set of seismic receivers R and the set of seismic sources S:

$$\begin{matrix}(r_1, s_1)(r_1, s_2) \\ (r_2, s_1)(r_2, s_2)\end{matrix} = (r_i, s_j) = \Phi_{ij} = \begin{matrix}\Phi_{11}\Phi_{12} \\ \Phi_{21}\Phi_{22}\end{matrix} \quad (1)$$

and where $\Phi_{ij}$ connotes a general collection of seismic signals generated for receiver element $r_i$ of the set of seismic receivers R in response to the seismic energy imparted into the earth's subterranean formations by source element $s_j$ in the set of seismic sources S. A specific collection of seismic signals $\Phi_{ij}$ for all indices i and j represents the seismic signals generated by the independent initiation of the source elements $s_j$ in the set of seismic sources S along at least two linearly independent lines of action $s_1$ and $s_2$ each detected by elements $r_i$ of the set of seismic receivers along at least two linearly independent lines of action $r_1$ and $r_2$ and is hereafter designated a concord of seismic signals K.

By extension, K can represent a concord of seismic signals $\Phi_{ij}$ generated from seismic energy imparted by a set of seismic sources S having three three elements $s_1$, $s_2$ and $s_3$ and detected by a set of seismic receivers R having three $r_1$, $r_2$, and $r_3$. Each element $s_j$ and $r_i$ have linearly independent lines of action. In the notation that has been introduced:

$$\begin{matrix}(r_1, s_1)(r_1, s_2)(r_1, s_3) \\ (r_2, s_1)(r_2, s_2)(r_2, s_3) \\ (r_3, s_1)(r_3, s_2)(r_3, s_3)\end{matrix} = (r_i, s_j) = \Phi_{ij} = \begin{matrix}\Phi_{11}\Phi_{12}\Phi_{13} \\ \Phi_{21}\Phi_{22}\Phi_{23} \\ \Phi_{31}\Phi_{32}\Phi_{33}\end{matrix} \quad (2)$$

Those skilled in the art recognize the relationship between Equations (1) and (2); however, to simplify the nature of the forthcoming description only those sets of seismic sources S and sets of seismic receivers, limited to elements having only two linearly independent lines of action, will be discussed.

Further discussion will be provided concerning preferred lines of action of the elements $s_j$ and $r_i$ in a set of seismic sources S and seismic receivers R. Presently, no limitation has been imposed upon relative orientations of the lines of action $s_1$ and $s_2$ or the lines of action $r_1$ and $r_2$ other than that they be linearly independent. As will be discussed later, in one embodiment pairs of the elements $s_j$ of the set of seismic sources S and the elements $r_i$ in the set of seismic receivers R can have the same lines of action.

Except where specifically noted to the contrary, the general collection of seismic signals $\Phi_{ij}$ will be understood, hereinafter, to also comprehend the specific collection of seismic signals designated a concord of seismic signals K. That is, the concord of seismic signals K defines the minimum usable collection of seismic signals $\Phi_{ij}$. As will shown later, various seismic data acquisition techniques can be employed to form a concord of seismic signals K.

When ordered pairs of the elements $r_i$ of the set of seismic receivers R and the elements s of the seismic sources S have the same indices, e.g., ($r_1$,$s_1$), this notation is intended to indicate that both the elements of the set of seismic sources S and the set of seismic receivers R have the same lines of action or polarization and are said to be "matched". The consequence of employing matched pairs of source elements $s_j$ and receiver elements $r_i$ is to produce matched components of the seismic signals, e.g., $\Phi_{11}$ and $\Phi_{22}$. If the indices for ordered pairs of the elements of the set of seismic sources S and the seismic receivers R are different, e.g., ($r_1$,$s_2$), this notation is intended to indicate that the elements in the set of seismic sources S and the seismic receivers R have different lines of action or polarization and are said to be "unmatched". The consequence of employing unmatched pairs of source elements $s_j$ and receiver elements $r_i$ is to produce unmatched components s of the seismic signals, e.g., $\Phi_{12}$ and $\Phi_{21}$. Whereas, the general notation ($r_i$,$s_j$) comprehends both matched and unmatched pairs of elements of sets seismic sources S and seismic receivers R.

As previously noted, the seismic wave energy imparted by elements $s_j$ in the set of seismic sources S and detected by the elements $r_i$ in a set of seismic receivers R is represented by the seismic signals $\Phi_{ij}$. The seismic signals $\Phi_{ij}$ contain information regarding the geological character of the subterranean formation. It is understood by those skilled in the art that the seismic signals $\Phi_{ij}$ can be collected in a seismic survey E for a plurality of ordered pairs of seismic source locations $S_q$ and receiver locations $R_p$ as shown generally in FIG. 3. In the notation developed, this is generally denoted $(\Phi_{ij})_{pq}$; i.e., the seismic response observed by the element $r_i$ in the set of seismic receivers R located at $R_p$ resulting from the seismic energy imparted by the elements $s_j$ a set of seismic sources S located at $S_q$.

Figure 3:
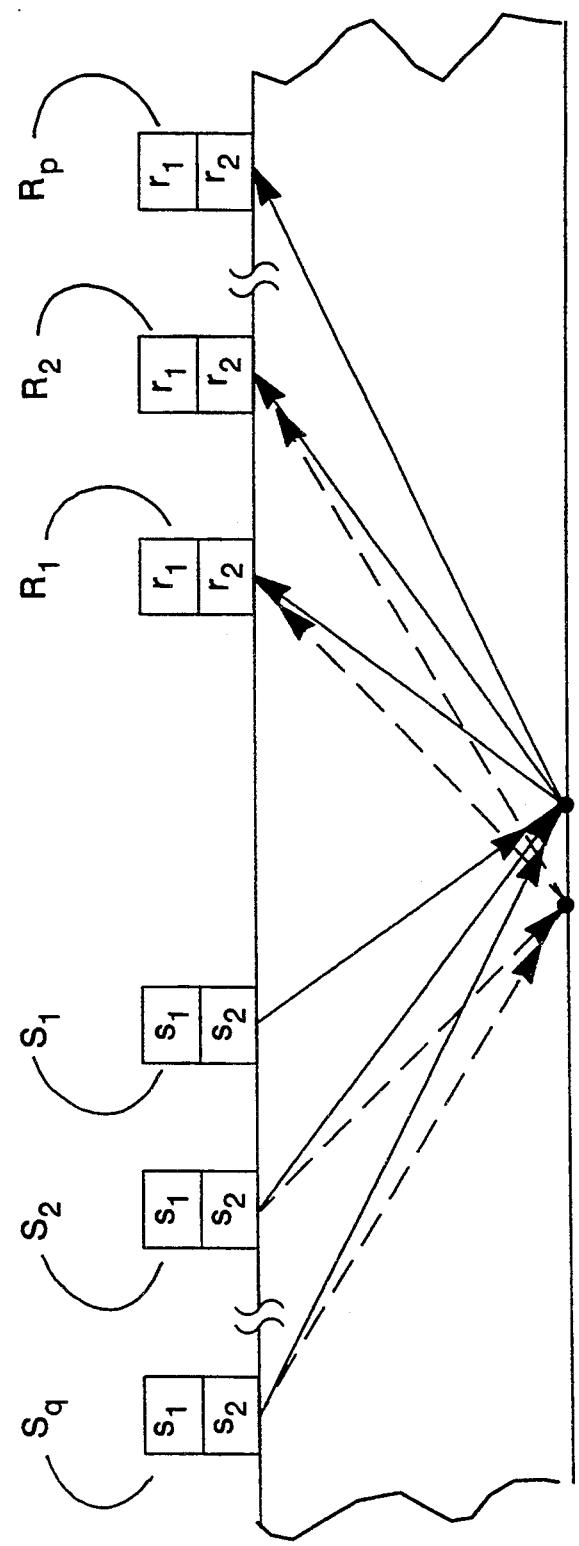
FIG. 3 is a schematic example of the present invention employing multiple sets of seismic sources and seismic receivers.

In FIG. 3, multiple source locations $S_1$, $S_2$, . . . , $S_q$ and multiple receiver locations $R_1$, $R_2$ . . . . $R_p$ are laid out in the seismic survey E. It is further understood that the seismic survey E can either be linear or areal in extent. At each source location $S_q$, the source elements $s_j$ in the set of seismic sources S are adapted to impart seismic wave energy into the earth's formations along at least two linearly independent, lines of action $s_1$ and $s_2$. At each seismic receiver location $R_p$, the receiver elements $r_i$ in the set of of seismic receivers R are adapted to detect seismic wave energy in at least two linearly independent, lines of action $r_1$ and $r_2$.

Once having acquired a plurality of seismic signals $(\Phi_{ij})_{pq}$ in the seismic survey E, the seismic signals $(\Phi_{ij})_{pq}$ can be processed, for example common depth point (CDP) processing techniques, to form either CDP stacked seismic signals $\beta_{ij}$ or a common depth point gathers of seismic signals $\beta_{ij}$. The concord of CDP stacked seismic data shown in FIGS. 4a–d were created from the elements of the stacked seismic signals $\beta_{ij}$, i.e., $\beta_{11}$, $\beta_{21}$, $\beta_{12}$ and $\beta_{22}$. Each element of the CDP stacked seismic signals $\beta_{ij}$ is formed by stacking elements of the seismic signal $(\Phi_{ij})_{pq}$, e.g., $(\Phi_{11})_{pq}$. Since this collection of seismic signals $\Phi_{ij}$ is for all i and j, the collection of seismic data displayed in FIGS. 4a–d is referred to as a concord of seismic data.

The concord of seismic data of FIGS. 4a–d was generated from field data and are demonstrative of the difficulties associated with the acquisition of shear wave seismic data.

Figure 4B:
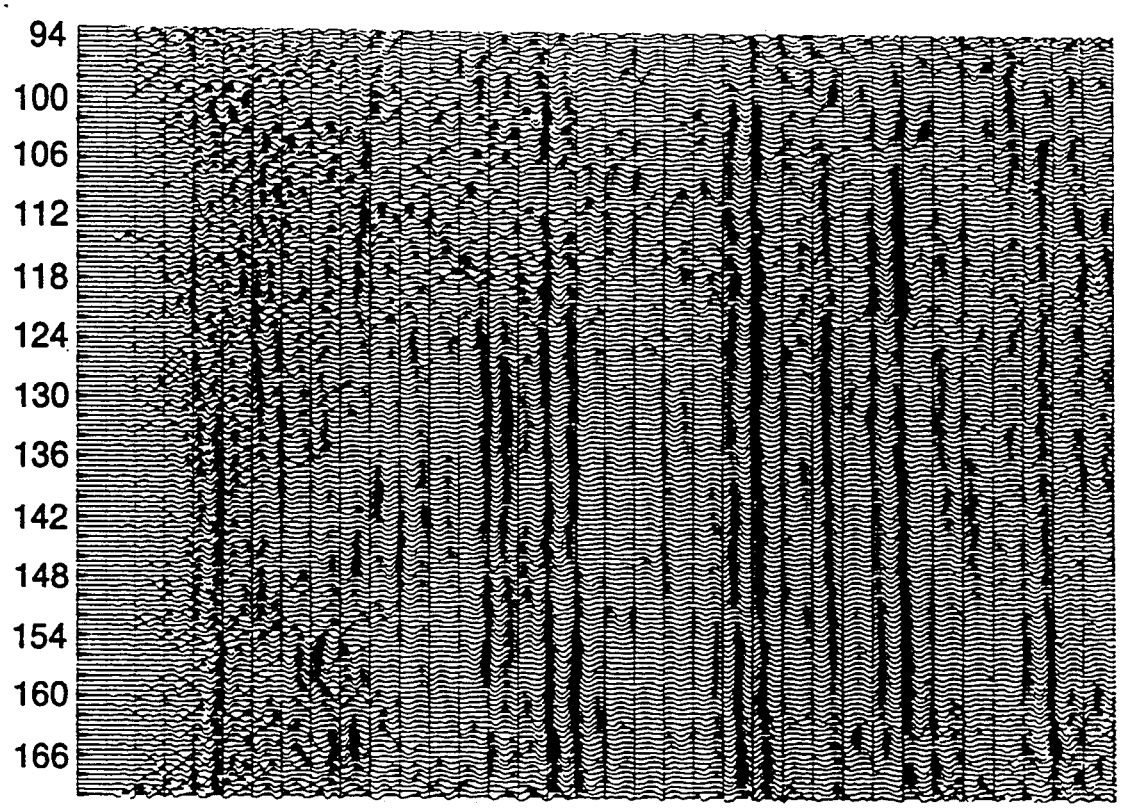
FIGS. 4a-d are a concord of common depth point (CDP) stacked seismic data obtained from field data.
Figure 4A:
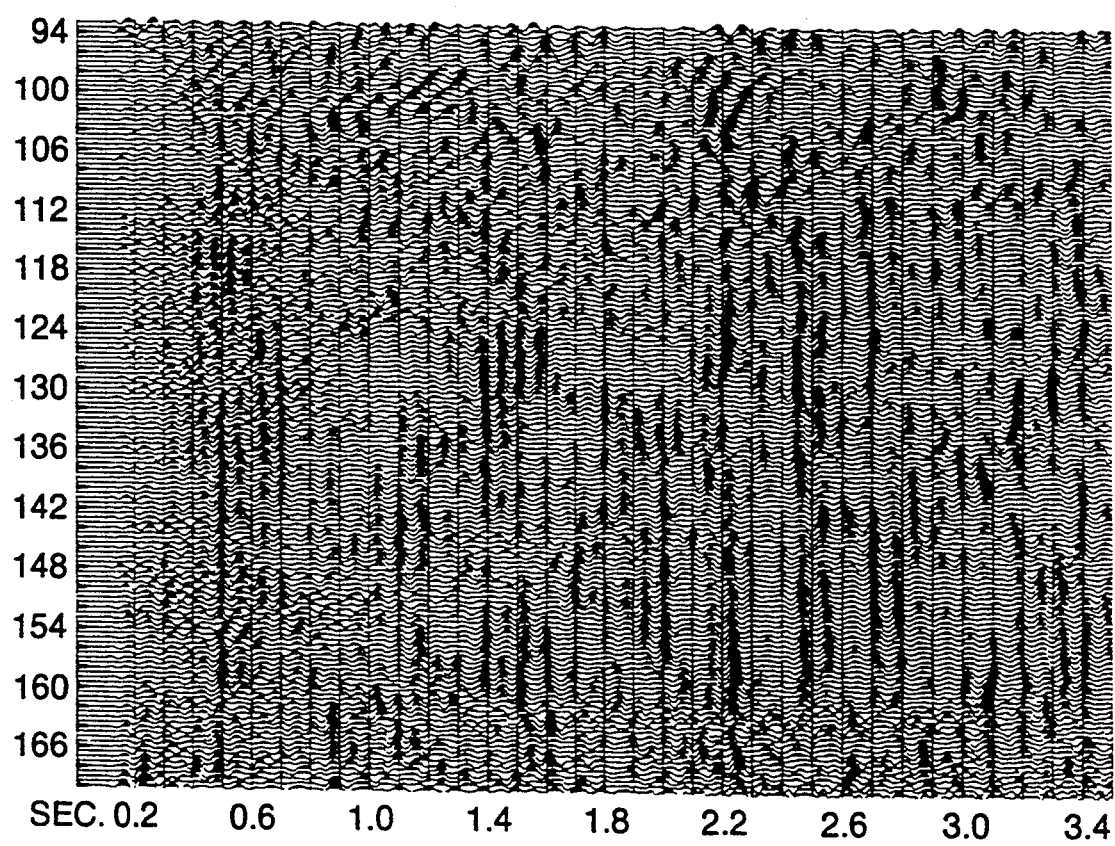
Figure 4D:
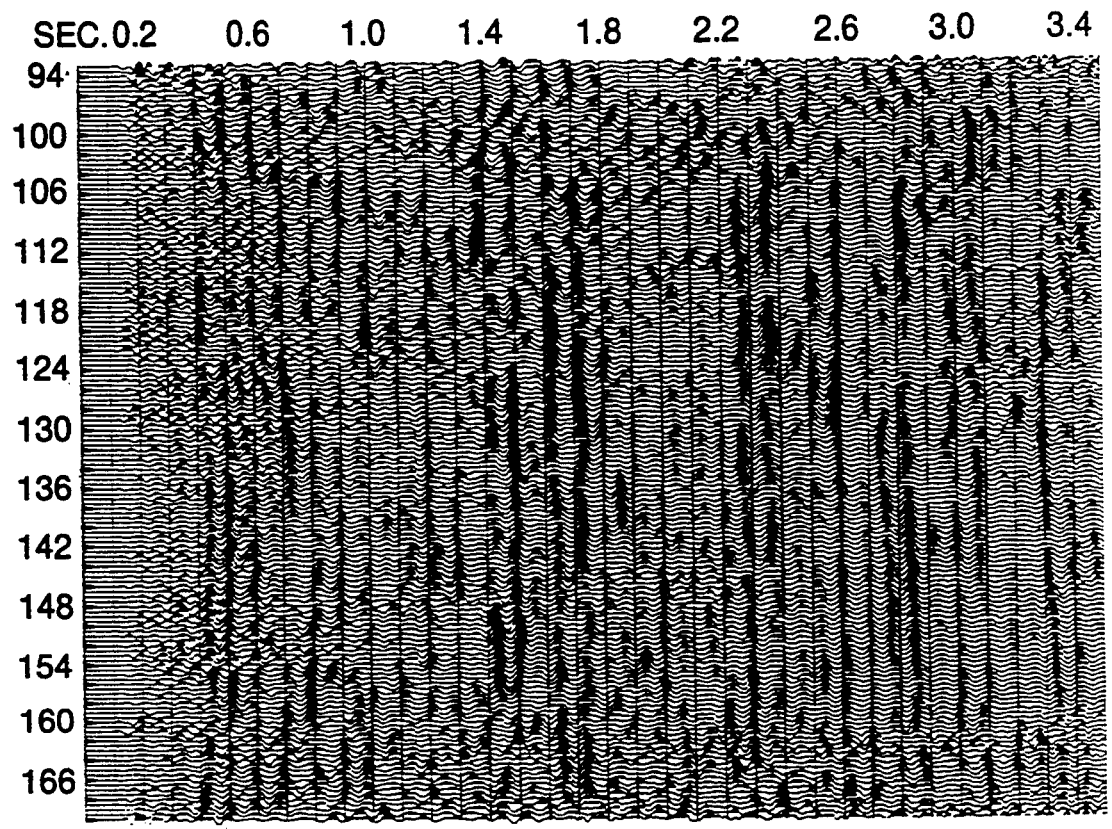

In particular, FIGS. 4a and 4d represent CDP stacked seismic data produced with elements $s_j$ in the set of shear wave seismic sources S and elements $r_i$ in the set of shear wave seismic receivers R having matched lines of action. The seismic data of FIG. 4a is developed from the CDP stacks of the seismic signals $\Phi_{22}$ and the seismic data of FIG. 4d is developed from the CDP stacks of the seismic signals $\Phi_{11}$. Even to the trained eye, the seismic data of FIGS. 4a and 4d lack sufficient correlation of seismic events and are thus not interpretable.

Figure 4C:
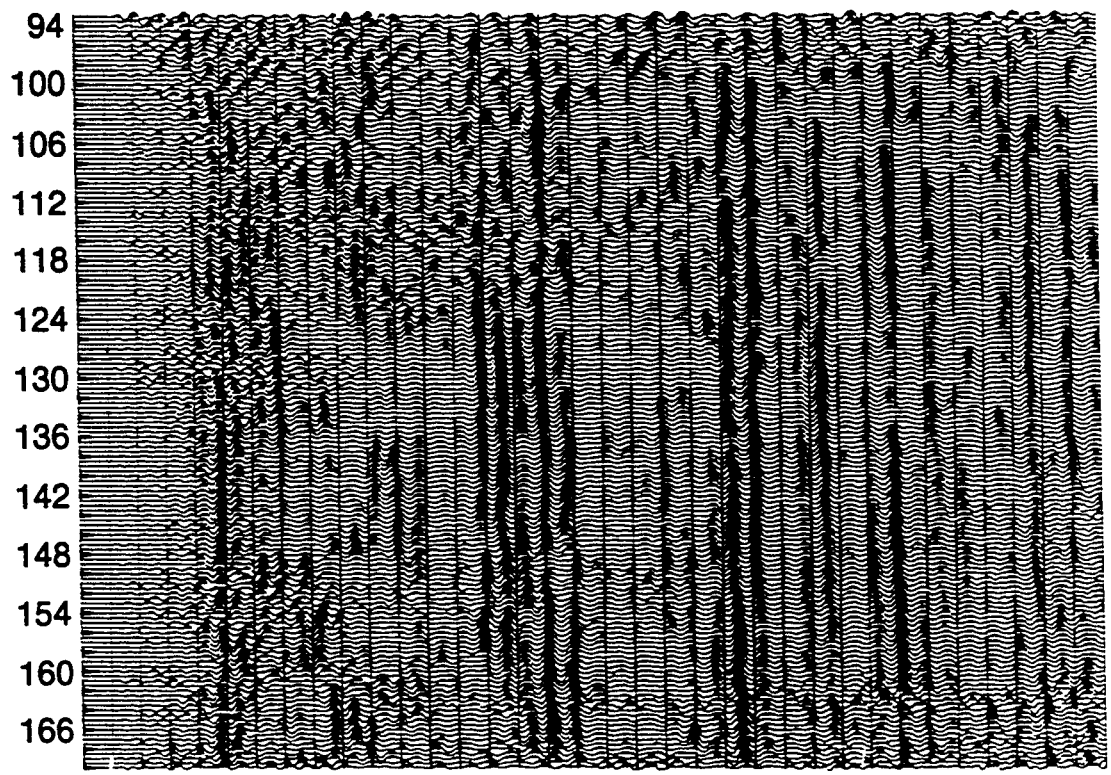

The seismic data of FIGS. 4b and 4c are CDP stacked seismic data developed from the CDP stacks of the seismic signals $\Phi_{12}$ and $\Phi_{21}$, respectively. In the CDP seismic data of FIGS. 4b and 4c, the elements $s_j$ and $r_i$ in the sets of seismic sources S and seismic receivers R have unmatched lines of action which are orthogonal one to the other. It is clear even to the untrained eye that significant spatially coherent energy is present in both FIGS. 4b and c. Previously, for such a geometrically simple subterranean formation, both CDP stacks of the seismic signals $\Phi_{12}$ and $\Phi_{21}$ were believed to contain only noise, i.e., no spatially coherent seismic events. In this case, the misconceptions stem from ignoring the effects of azimuthal anisotropy in the subterranean formations.

Figure 5:
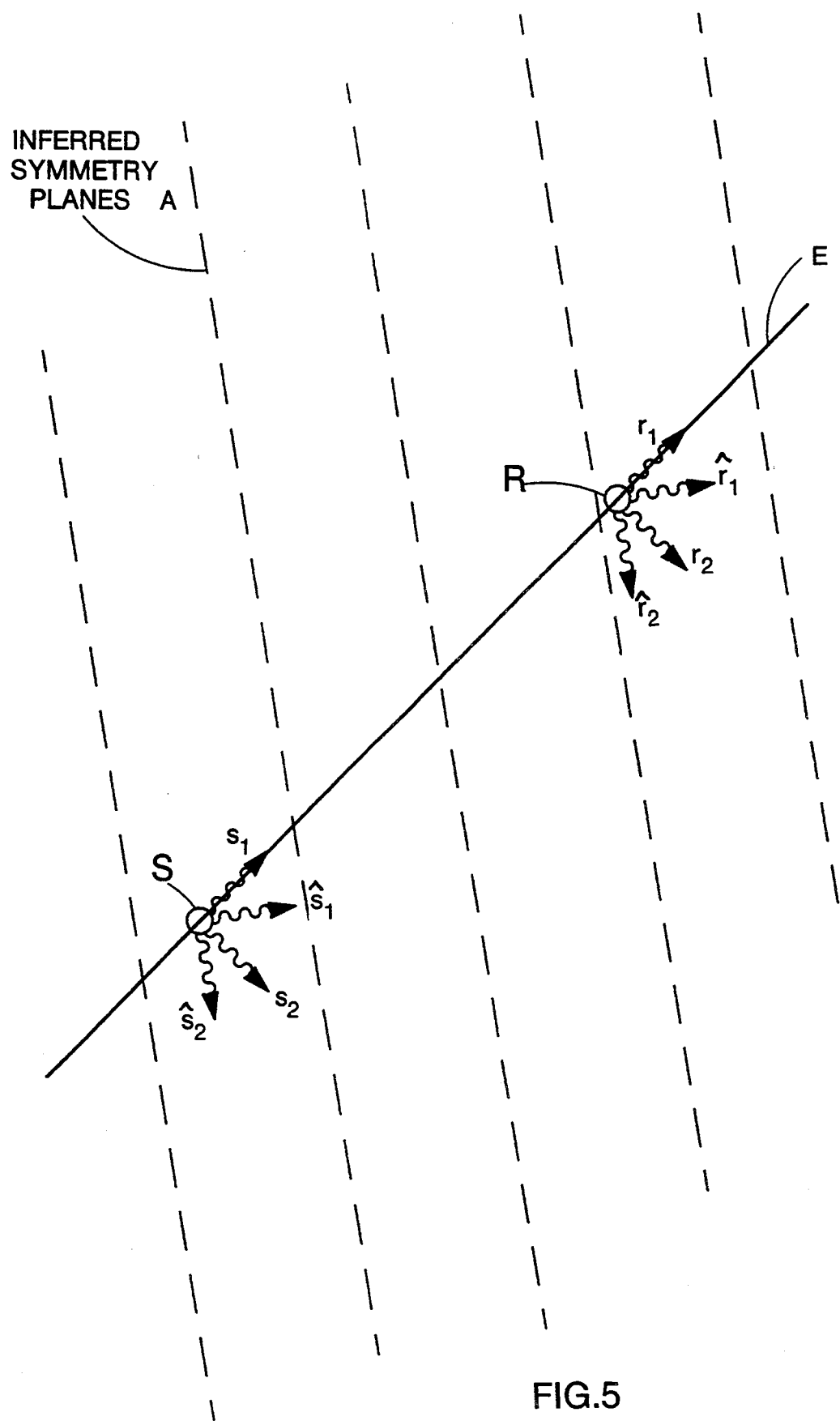
FIG. 5 is a topographical view representing the relationship between the line of survey E, the lines of action of the elements $r_1$, $r_2$; $\hat{r}_1$; $\hat{r}_2$, $s_1$, $s_2$; $\hat{s}_1$, $\hat{s}_2$; and the inferred planes of symmetry A of the subterranean formation from which the field data was obtained.
Figures 6A, 6B, 6C, 6D:
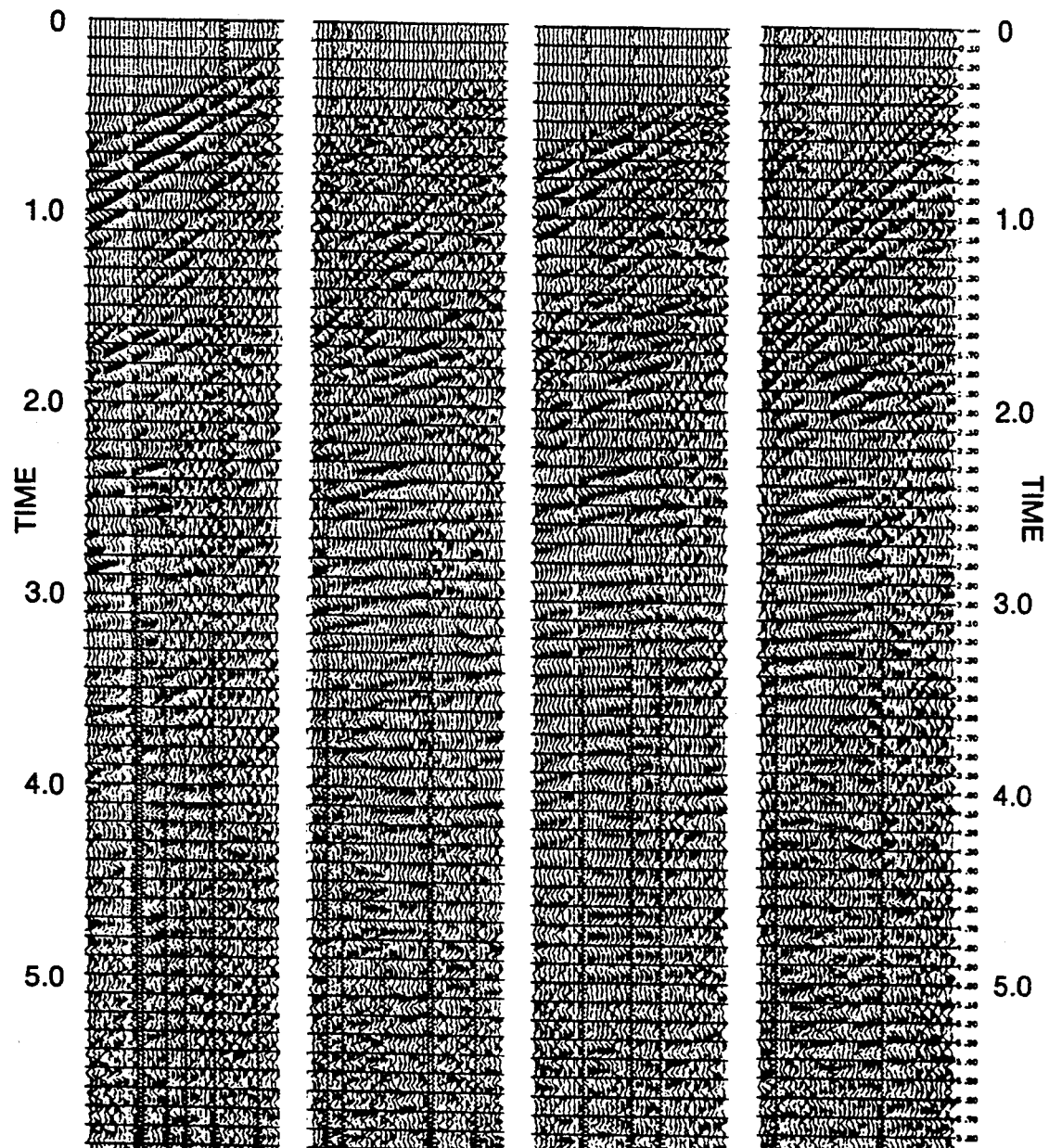
FIGS. 6a-d are a concord of common source point (CSP) seismic data corresponding to common source point gathers of seismic signals obtained with elements having lines of action $r_1$, $r_2$ and $s_1$, $s_2$.

One known causation of such poor correlation of the seismic data between FIGS. 4a and 4d and the considerable seismic wave energy portrayed in FIGS. 4b and 4c is shear polarization splitting or shear birefringence resulting from an azimuthally anisotropic subterranean formation. In particular, this result can occur if the lines of action of the source elements $s_j$ in the set of the seismic sources S and the lines of action of the receiver elements $r_i$ in the set of seismic receivers R are not appropriately oriented with respect to the symmetry planes of the azimuthally anisotropic subterranean formation. Unfortunately, the orientation of the azimuthally anisotropic subterranean formation's symmetry planes is generally not known beforehand as evidenced in the seismic sections shown in FIGS. 4a and 4d. In fact, FIG. 5 shows the orientation of a line in profile of seismic survey E with respect to the lines of action of the elements $s_1$ and $s_2$ and of the elements $r_1$ and $r_2$ of the set of seismic receivers R as well as the inferred orientation of the planes of symmetry A in subterranean formation.

The anomalous appearance of the CDP stacked seismic data in FIGS. 4a–d can also be observed in a concord of common source point gathers of seismic data displayed in FIGS. 6a–d produced from common source point gathers of the seismic signals $(\Phi_{ij})_{pq}$ designated as $\beta'_{ij}$ taken along the same line of profile $E_1$.

The concord of seismic data displayed in FIGS. 6a–d are developed from a single source location $S_q$ and at sixty (60) different receiver locations $R_p$. The elements of the seismic data shown in FIGS. 6a–d are for different pairings of the elements $r_i$ and $s_j$ in the set of seismic receivers R and the seismic sources. Although correlation of events is difficult on such "raw data," it is certainly anomalous to record the significant seismic energy on the unmatched seismic signals $\beta'_{12}$ and $\beta'_{21}$ in seismic sections 6b and 6c. In both cases, the seismic energy is received with the elements $r_i$ of the set of seismic receivers R having lines of action orthogonal to the lines of action of the elements $s_j$ of seismic source S.

Figures 7A, 7B, 7C, 7D:
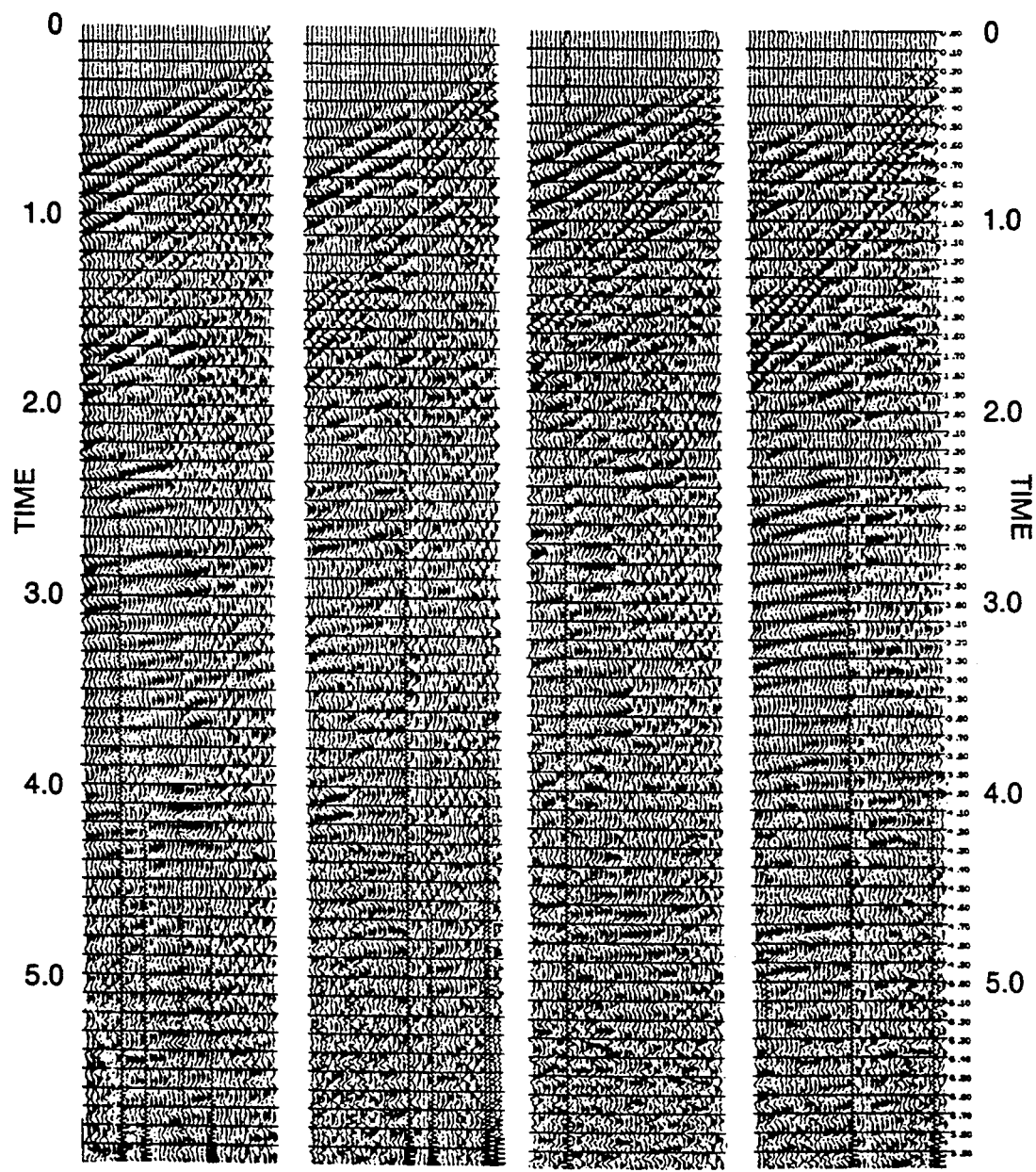
FIGS. 7a-d are a concord of common source point seismic data in which the original lines of action of the elements $r_1$, $r_2$; $s_1$ and $s_2$ used to obtain the seismic data shown in FIGS. 6a-d have been physically rotated into lines of action represented by the elements $\hat{r}_1$, $\hat{r}_2$ and $\hat{s}_1$ and $\hat{s}_2$ as shown in FIG. 5.
Figure 8B:
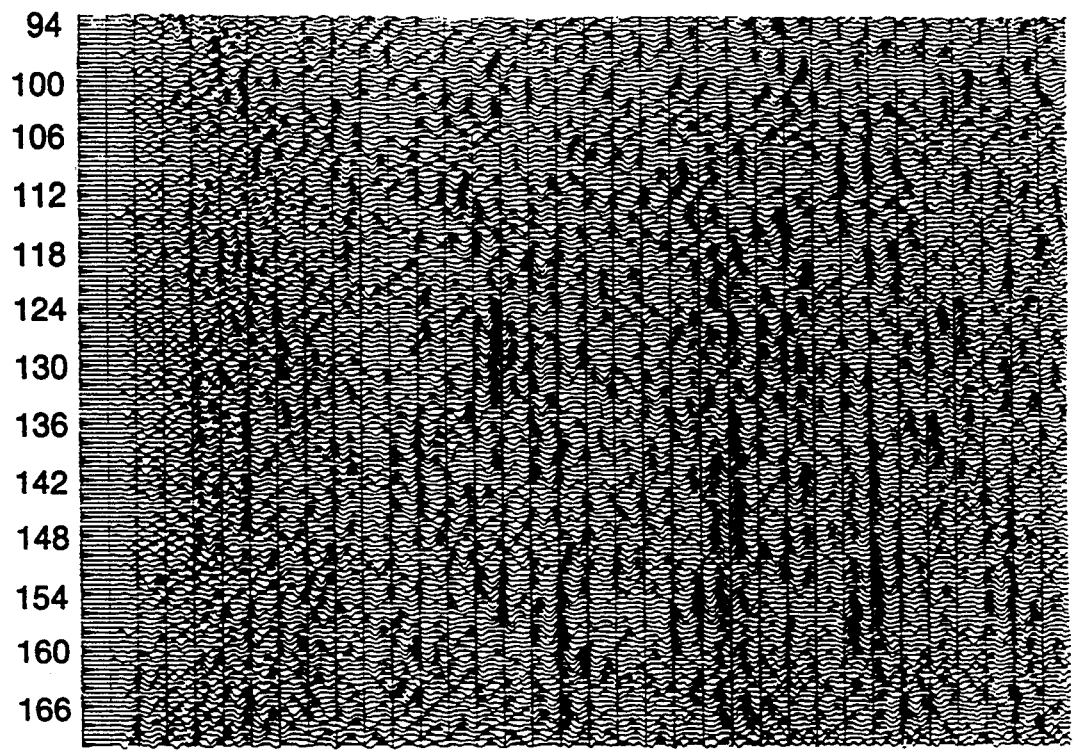
FIGS. 8a–d are a synthetic concord of CDP stacked seismic data in which the synthetic orientation of the lines of action of the elements $\bar{r}_1$, $\bar{r}_2$ and $\bar{s}_1$, $\bar{s}_2$ of the synthetic set of seismic sources and seismic receivers correspond to the physical lines of action of the elements $r_1$, $r_2$, and $s_1$, $s_2$ of the synthetic set of seismic sources and seismic receivers as shown in FIG. 5.
Figure 8A:
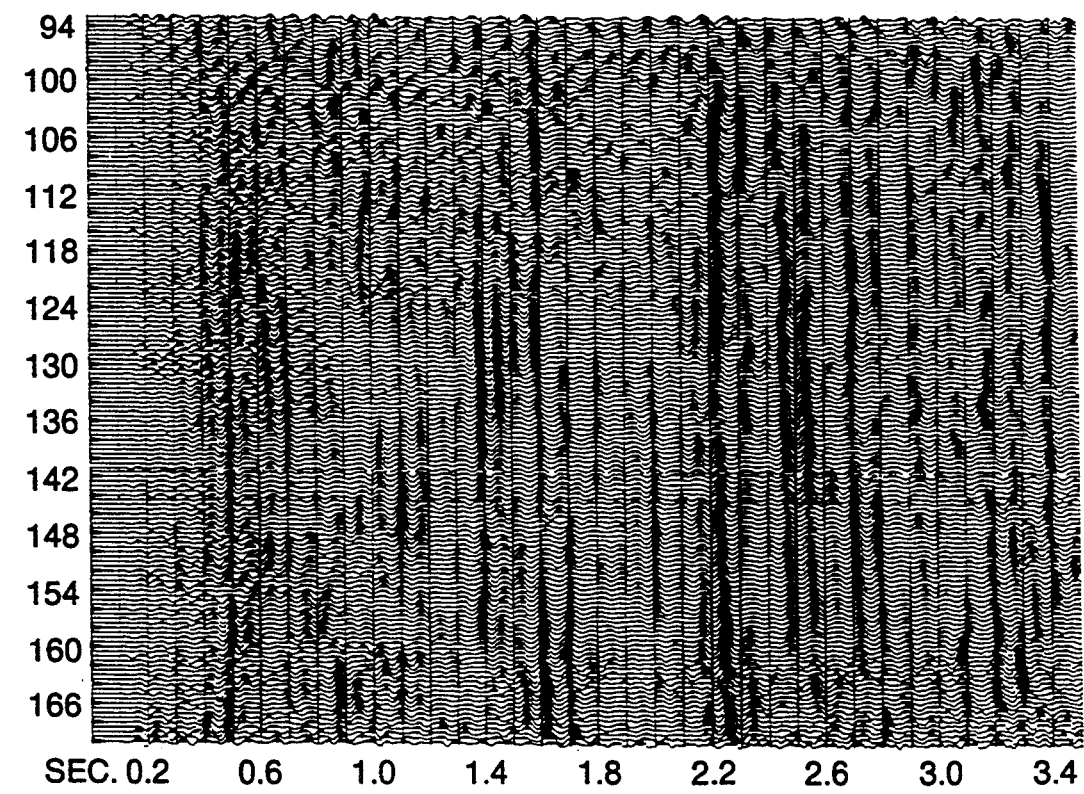
Figure 8D:
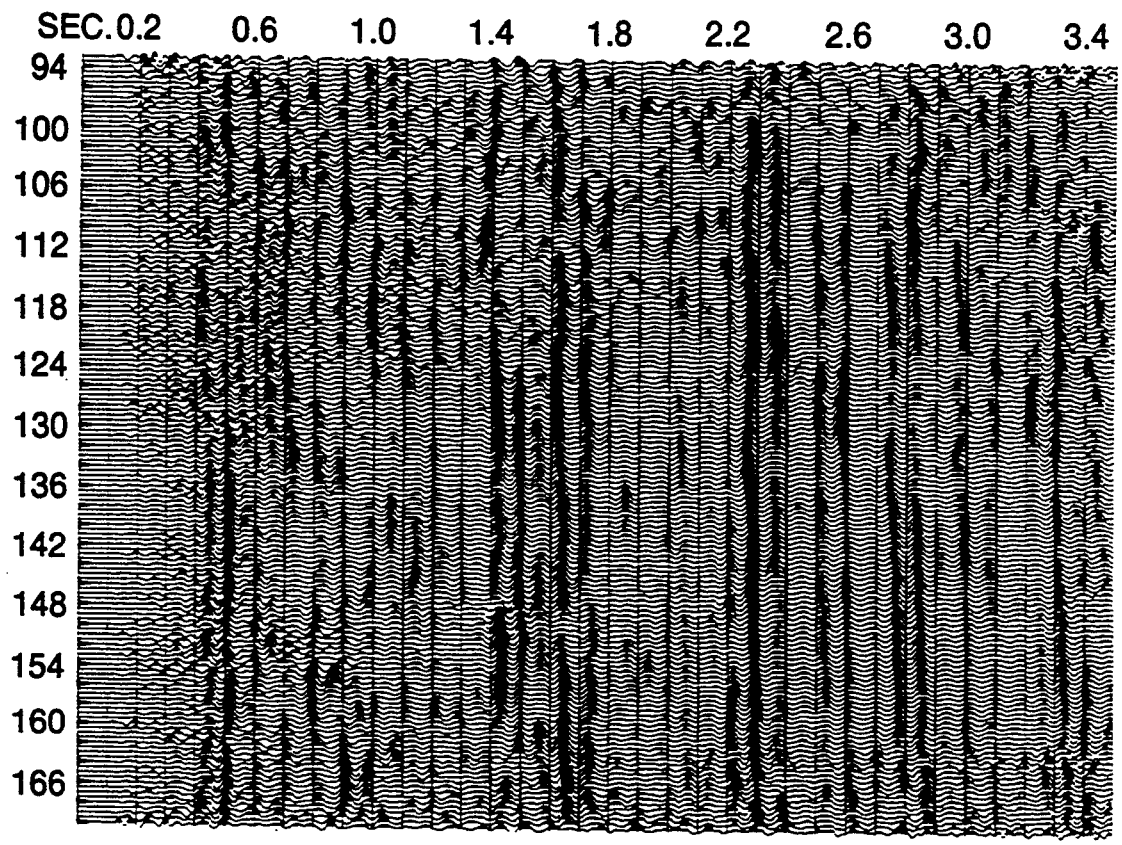
Figure 8C:
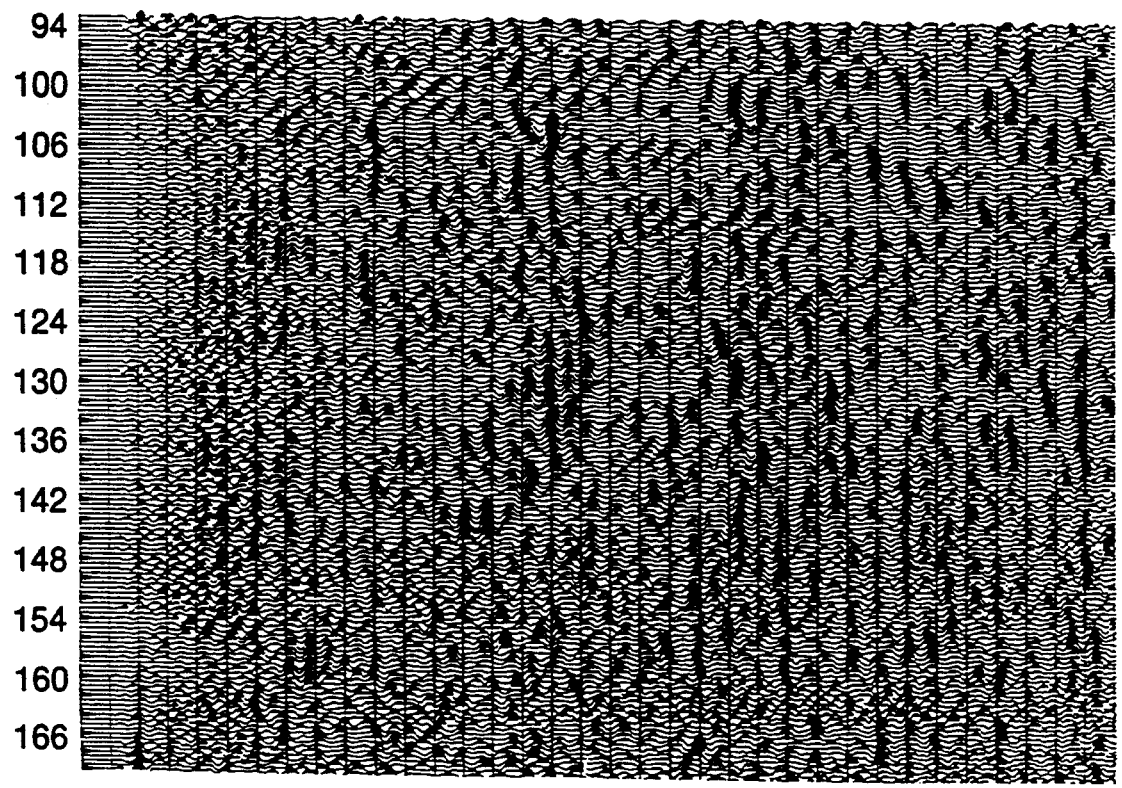
Figures 9A, 9B, 9C, 9D:
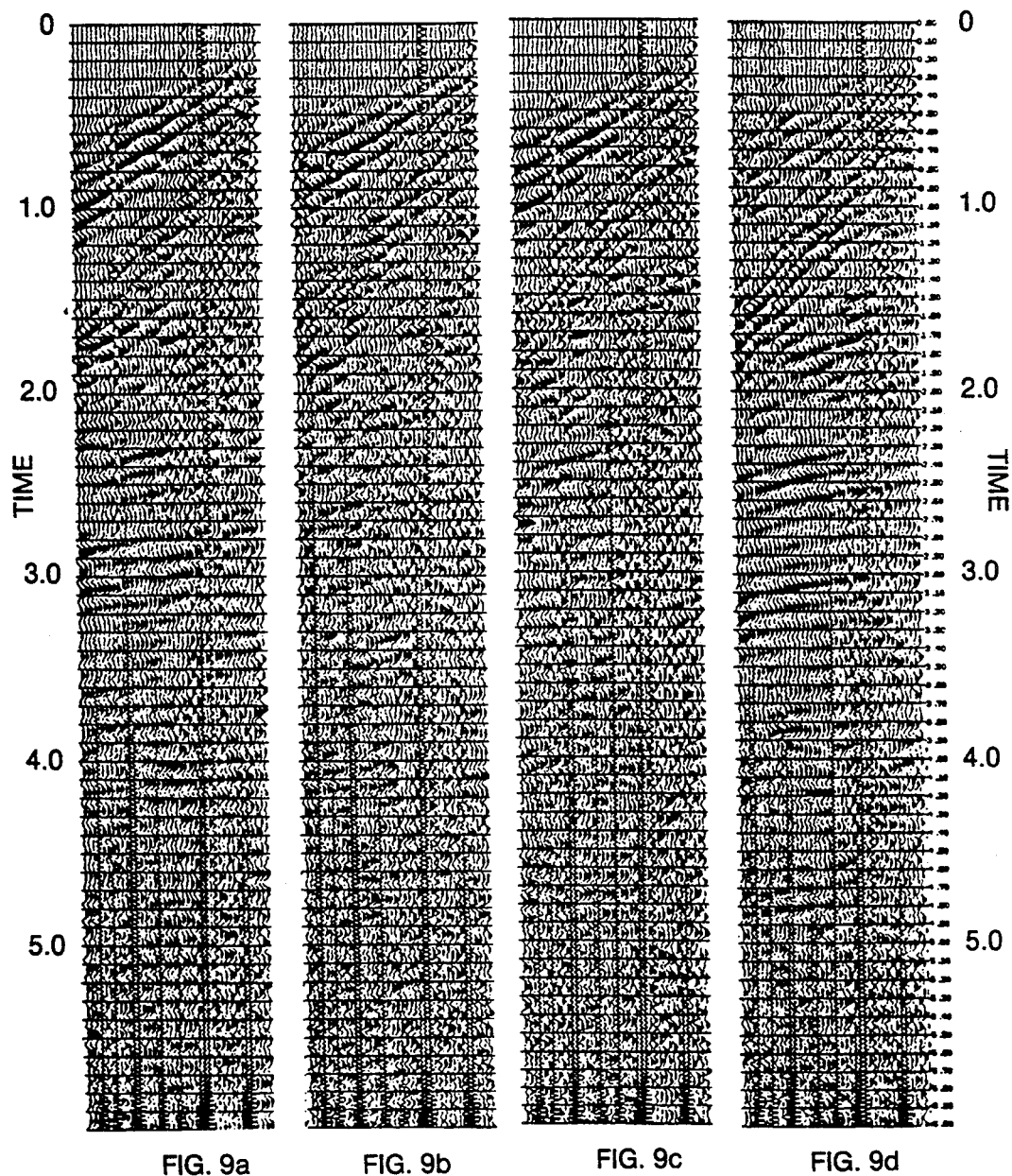
FIGS. 9a–d are a synthetic concord of common source point seismic data in which the synthetic lines of actions of the elements $\bar{r}_1$, $\bar{r}_2$; $\bar{s}_1$, $\bar{s}_2$ correspond to the physical lines of action represented by the elements $r_1$, $r_2$; $s_1$, $s_2$ in FIG. 5.

To further motivate the discussion, a common source point gather of the seismic signals $\beta'_{ij}$ are represented in the concord of seismic data of FIGS. 7a–d taken along the same line of profile in the seismic survey E. In this example, the elements $r_i$ and $s_j$ in the set of seismic sources S and seismic receivers R have a different set of substantially orthogonal lines of action. In fact, the orientations of the elements $r_i$ and $s_j$ were selected to be physically appropriate for the inferred anisotropic symmetry planes A of the subterranean formation as shown in FIG. 5. The unmatched or cross component seismic signals $\beta'_{12}$ and $\beta'_{21}$ in the seismic section of FIGS. 7b and 7c show considerably less seismic energy than the matched component or principal components of the seismic signals $\beta'_{22}$ and $\beta'_{11}$ in the seismic sections of FIG. 7a and 7b.

ORIENTATION MODULE

An orientation module F will now be described which can synthetically rotate the lines of action of the elements $r_i$ and $s_i$ to new synthetic lines of action of the elements $\bar{r}_i$ and $\bar{s}_j$ so as to correspond with the physically oriented lines of action of the elements $r_i$ and $s_j$ previously described or to any other desired orientation.

Recall that for selected source locations $S_q$ and selected receiver locations $R_p$ a collection of seismic signals $(\Phi_{ij})_{pq}$ can be developed or simply $\Phi_{ij}$ if the locations indices are suppressed.

The foregoing is a description of a receiver operator $C_{ci}$ and a source operator $M_{jm}$ collectively referred to as an orientation module F. The orientation module F operates on the seismic signals $\Phi_{ij}$ to produce a synthetic seismic signals $\Phi_{cm}$ having synthetic lines of action generally different from those of the original seismic signals $\Phi_{ij}$. It is instructive to recall at this juncture that the indices i,j and c,m are dummy variables and that the changes from indices i,j to c,m have been employed merely as an aid in further differentiating between the seismic signals $\Phi_{ij}$ and $\Phi_{ij}$ and the synthetic seismic signals $\Phi_{cm}$. As will be discussed later, optimizing the selection of a particular rotation of the synthetic of seismic signals $\Phi_{cm}$ can be used to infer the geological character of the subterranean formation by focusing on a particular component of the seismic wave energy.

The receiver operator $C_{ci}$ is adapted to transform the lines of action of tile elements $r_i$ in the set of seismic receivers R into a synthetic set of lines of action for the elements $\bar{r}_c$ for a synthetic set of seismic receivers $\bar{R}$. The receiver operator $C_{ci}$ is thus a vector rotation adapted to transform the original set of linearly independent lines of action for the elements $r_i$ in the set of seismic receivers R into a synthetic set of linearly independent lines of action for the elements $\bar{r}_c$ in the set of synthetic seismic receivers $\bar{R}$. Impressing the receiver operator $C_{ci}$ on the seismic signals $\Phi_{ij}$ produces synthetic seismic signals $\Phi_{cj}$ which can be thought of as the result of a set of synthetic receivers $\bar{R}$ with elements $\bar{r}$ having linearly independent lines of action generally different from those in the set of seismic receivers R yet still receiving the same seismic wave energy imparted by the elements $s_j$ in the set of seismic sources S.

In a similar fashion, the source operator $M_{jm}$ is adapted to transform the lines of action of the elements $s_j$ of the set of seismic source S into a set of synthetic lines of action of the elements $\bar{s}_m$ for a synthetic set of seismic sources $\bar{S}$. The source operator $M_{jm}$ is thus a vector rotation adapted to transform the first set of linearly independent lines of action for the elements $s_j$ in the set of seismic sources S into a synthetic set of linearly independent lines of action for the elements $\bar{s}_m$ of a synthetic seismic source $\bar{S}$. Impressing the seismic source operator $M_{jm}$ on the seismic signals $\Phi_{ij}$ produces synthetic seismic signals $\Phi_{im}$ which can be thought of as the result of a set of synthetic seismic sources $\bar{S}$ with elements $\bar{s}_m$ having linearly independent lines of action generally different from those in the set of the seismic source S yet detecting the seismic wave energy with the elements $r_i$ in the set of seismic receivers R.

The combined operation of the operators $C_{ci}$ and $M_{jm}$ on the seismic signals $\Phi_{ij}$, more succinctly the operation of orientation module F, produces synthetic seismic signals $\Phi_{cm}$ which can be thought of as having acquired synthetic seismic signals $\Phi_{cm}$ resulting from the independent initiation of elements $\bar{s}_m$ in the set of seismic sources $\bar{S}$ and detected by the elements $\bar{r}_c$ in the set of seismic receivers $\bar{R}$. Using the Einstein summation convention, explicitly noting the source locations $S_q$ and receiver locations $R_p$ and using the above notation:

$$(\Phi_{cm})_{pq} = (C_{ci})_{pq} (\Phi_{ij})_{pq} (M_{jm})_{pq} \quad (3)$$

Hence, one can generate a plurality of synthetic seismic signals $\phi_{cm}$ having elements $\bar{r}_c$ and $\bar{s}_m$ for a plurality of synthetic lines of action. More simply stated, the original concord of seismic signals K has been transformed by the orientation module S into a synthetic concord of seismic signals $\bar{K}$.

Figure 11:
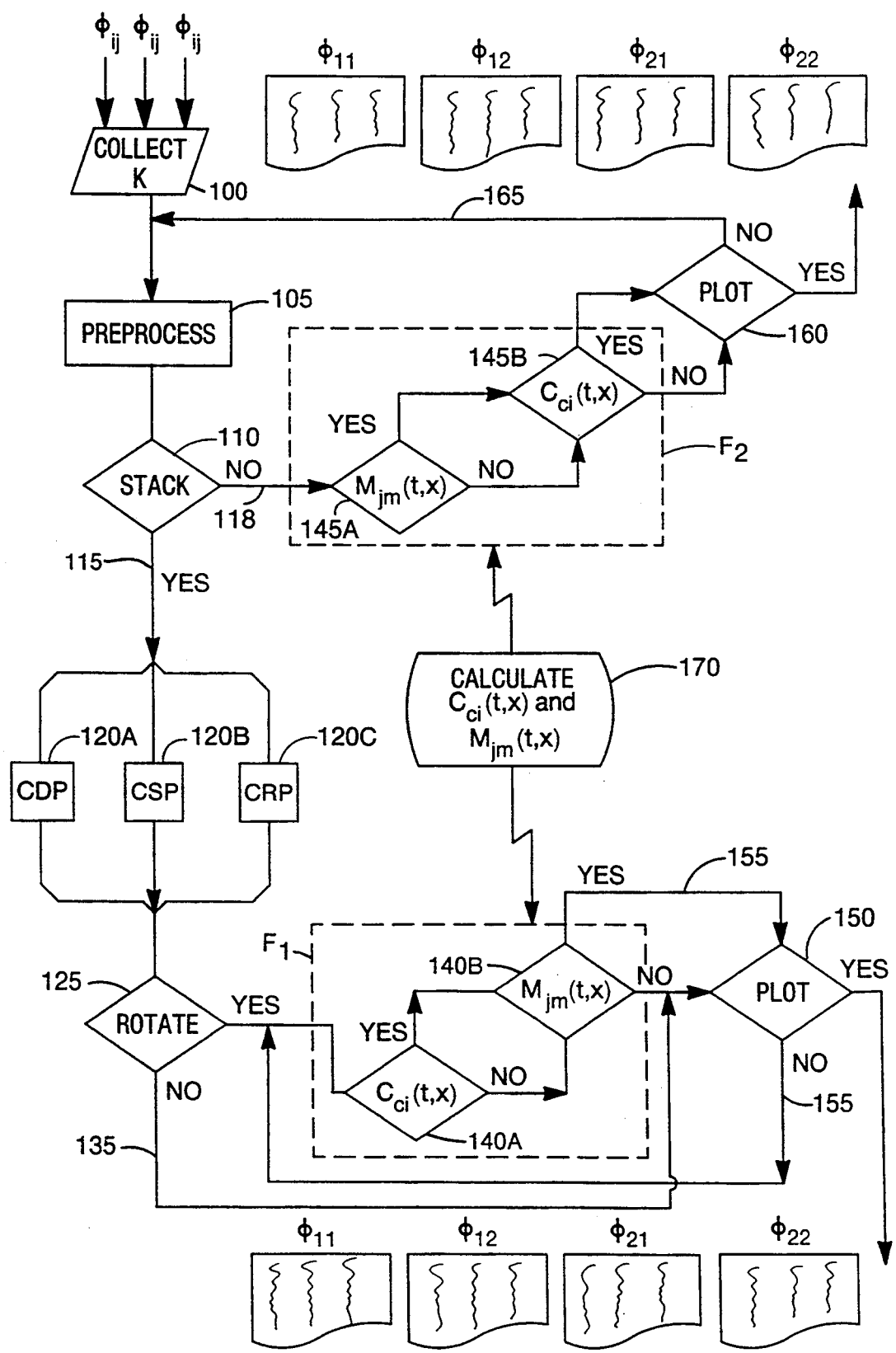
FIG. 11 is a generalized process flow diagram of the method of the present invention.
Figure 12:
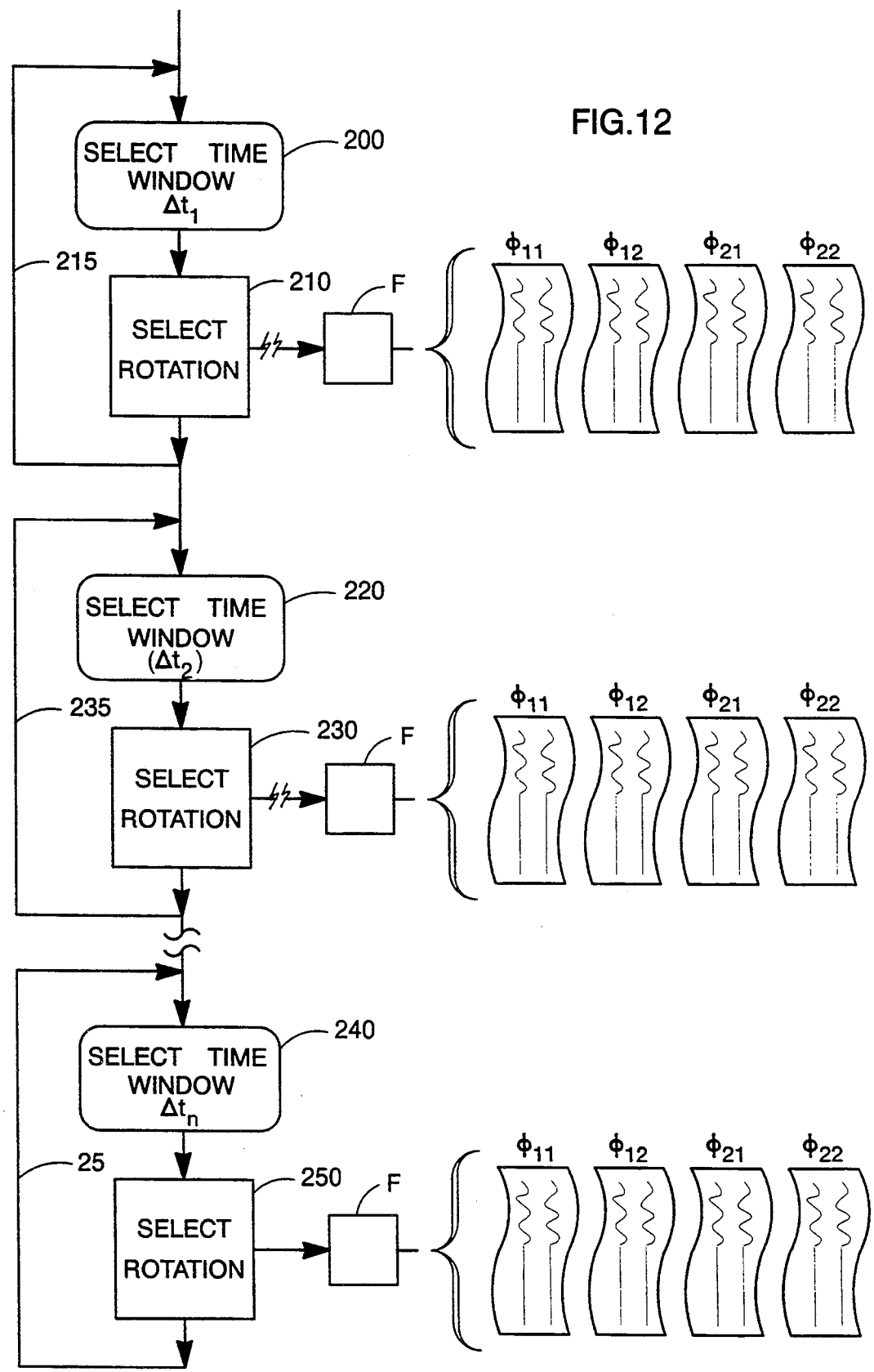
FIG. 12 is a generalized process flow diagram of the operation of other orientation module.

The orientation module F in the preferred embodiment is a computer processing unit adapted to implement the source operator $M_{jm}$ and the receiver operator $C_{ci}$. A flow process for the operation of the orientation module F is shown in FIGS. 11 and 12 and will be discussed later.

The benefits of the orientation module F are vividly demonstrated by comparing the CDP stack of the seismic signals $\Phi_{ij}$ portrayed in FIGS. 4a–3 with the synthetic CDP stack of the seismic signals $\Phi_{cm}$, portrayed in FIGS. 8a–d.

In particular, the concord of seismic data of FIG. 4 are CDP stacked seismic data produced from the CDP stack of the seismic signals $\Phi_{ij}$; i.e., the seismic signal of element $r_i$ of the set of seismic receivers R from seismic energy imparted by the element $s_j$ in the set of seismic sources S. Specifically, the CDP stacked seismic signals $\beta_{22}$ and $\beta_{11}$ represented in seismic sections FIGS. 4a and 4b correspond to the results of seismic exploration where the elements $r_i$ and $s_j$ of the set of seismic sources S and seismic receivers R have matched lines of action. While the CDP stacked seismic signals $\beta_{12}$ and $\beta_{21}$, heretofore believed to be substantially noise, represented in the seismic sections FIGS. 4b and 4c correspond to the seismic signals obtained with the elements $r_i$ and $s_j$ of the set of seismic sources S and the seismic receivers R having unmatched lines of action.

FIGS. 8a–d are a synthetic concord of CDP stacked seismic data produced by the operation of the orientation module F on the concord of CDP stacked seismic signals $\beta_{ij}$ and displayed in FIGS. 4a–d. The orientation module F, in this case, has been employed to reduce the effects of shear polarization splitting or birefringence by synthesizing new lines of action for the elements $r_i$ and $s_j$ in the set of seismic sources S and seismic receivers R such that the new synthetic lines of action of the elements $\bar{r}_c$, $\bar{s}_m$ are appropriately aligned with respect to symmetry planes A shown in dashed lines of FIG. 5. In effect, the useful seismic energy in the seismic signals shown in FIGS. 8a and b has been increased whereas the useful seismic energy has been decreased in the seismic signals shown in FIGS. 8b and c.

In FIGS. 9a–d, a concord of common source point gathers of seismic data has been obtained in the field along the same line of profile E with sets of seismic sources $\bar{S}$ and seismic receivers $\bar{R}$ having elements $\bar{s}_m$ and $\bar{r}_c$ synthetically oriented such that their lines of action correspond to lines of action of the physical elements $r_i$ and $s_j$ in the synthetic set of seismic sources S and the seismic receivers R and shown in FIGS. 7a–d. This synthetic orientation of the lines of action of the elements $\bar{r}_c$ and $\bar{s}_m$ corresponds to the appropriate alignment with respect to the symmetry planes of the subterranean formation to reduce the effects of shear polarization or birefringence. In fact, the common source point gathers of seismic data of FIGS. 7 and 9 are essentially identical.

The synthetic concord of seismic signals $\bar{K}$ depicted in FIG. 9 and the physical concord of seismic signals K depicted in FIG. 7 both contain substantially the same useful information. Although the physical orientation of the lines of action of the elements $s_j$ and $r_i$ in the set of seismic sources S and the seismic receiver receiver R is feasible after the appropriate orientation is known, the use of the orientation module F offers more practicability. The orientation module F can be employed to rotate the lines of action of the elements $s_j$ and $r_i$ in the set of seismic sources S and seismic receiver R, if desired, to any orientation provided a complete collection of seismic signals $\Phi_{ij}$ is available, i.e., a concord of seismic signals K.

The synthesized seismic signals $\Phi_{cm}$ represented in synthesized concord of common source point gathers of seismic data of FIGS. 9a–d, simulates the result that would have been obtained had the lines of action of the elements $\bar{r}_c$ and $\bar{s}_m$ in the set of seismic sources $\bar{S}$ and seismic receivers $\bar{R}$ been oriented as were the elements $r_i$ and $s_j$ in the set of seismic receivers and seismic sources S used to produce FIGS. 7a–d. The seismic data of FIGS. 9b and c indicate that the seismic energy developed by the unmatched seismic signals $\Phi_{21}$ and $\Phi_{12}$ has been substantially transferred to the seismic signals $\Phi_{22}$ and $\Phi_{11}$ depicted in the seismic sections of FIGS. 9a and 9d thereby simplifying the problems of interpreting the concord seismic sections. In fact, seismic sections of FIGS. 9a and 9d now exhibit the desired correlation amongst seismic events, and hence, can be used to interpret the geologic character of the subterranean formation.

The operation of the orientation module F can be thought of as vectorially rotating the lines of action of the elements $r_i$ and $s_j$ in the set of seismic sources S and seismic receivers R to accentuate a particular component of the seismic wave energy in order to infer the geological character of subterranean formations. The synthetic concords of seismic data of FIGS. 8a–d and 9a–d can enhance the interpretation of the geological character of the subterranean formations with seismic data obtained with shear wave seismic sources and shear wave seismic receivers when heretofore such interpretation has not been generally obtainable.

It has been inferred that the subterranean formation represented in the concords of seismic data in FIGS. 4, 6, 7, 8 and 9 is an azimuthally anisotropic media having generally parallel planes of symmetry as generally indicated by the dashed lines of FIG. 5. The synthetic lines of action of the elements $\bar{s}_m$, in the set of seismic sources S and the elements $\bar{r}_c$ in the set of seismic receivers $\bar{R}$ produced by orientation module F are also shown in FIGS. 5 and are seen to be substantially either parallel or perpendicular to the inferred planes of symmetry of the azimuthally anisotropic media.

It is meaningful at this point to note that the original line of profile of the seismic survey E, as well as the lines of action of the elements $s_j$ and $r_i$ in the set of the seismic sources S and seismic receivers R, need not have been preselected so as to insure acceptable results; rather, in any seismic survey utilizing sets of seismic sources S having elements $s_j$ adapted to impart seismic wave energy along at least two linearly independent lines of action $s_1$ and $s_2$ and sets of seismic receivers R having elements $r_i$ adapted to receive at least two components of such seismic wave energy along linearly independent lines of action $r_1$ and $r_2$ (i.e., a concord of seismic signals K) can produce interpretable seismic data.

The orientation module F cannot produce meaningful results unless a concord of seismic signals K is originally obtained. To further clarify this distinction, recall that existing techniques for collecting geophysical data have heretofore been limited to utilizing a first set of seismic sources S and seismic receivers R having elements $s_1$ and $r_1$ with matched lines of action to produce seismic signals $(\Phi_{11})_{pq}$. More recent techniques have added a second set seismic sources S and seismic receivers R having elements $s_2$ and $r_2$ with matched lines of action but different from $s_1$ and $r_1$ to produce seismic signals $(\Phi_{22})_{pq}$.

Prior techniques did not obtain the cross component seismic signals $(\Phi_{12})_{pq}$ and $(\Phi_{21})_{pq}$ and, in fact, such seismic signals were believed to be essentially noise and hence of no value. Operation of the orientation module F on such a collection of seismic data is not meaningful because of failure to collect adequate seismic data; i.e., a concord seismic signals K which have been found to contain useful information.

ACQUIRING A CONCORD OF SEISMIC SIGNALS

As previously shown in FIGS. 2 and 3, to develop a useful concord of seismic signals K (i.e., a complete set of seismic signals ($\Phi_{11}$, $\Phi_{12}$, $\Phi_{21}$ and $\Phi_{22}$) seismic wave energy is imparted by each element $s_j$ in the set of seismic sources S at source location $S_q$ and each element $r_i$ in the set of seismic receivers R is adapted to detect the seismic energy at receiver locations $R_p$. Although this scheme is preferred, there are innumerable P alternate schemes for acquiring a concord of seismic signals K as would be obvious to one skilled in the art.

Figure 10:
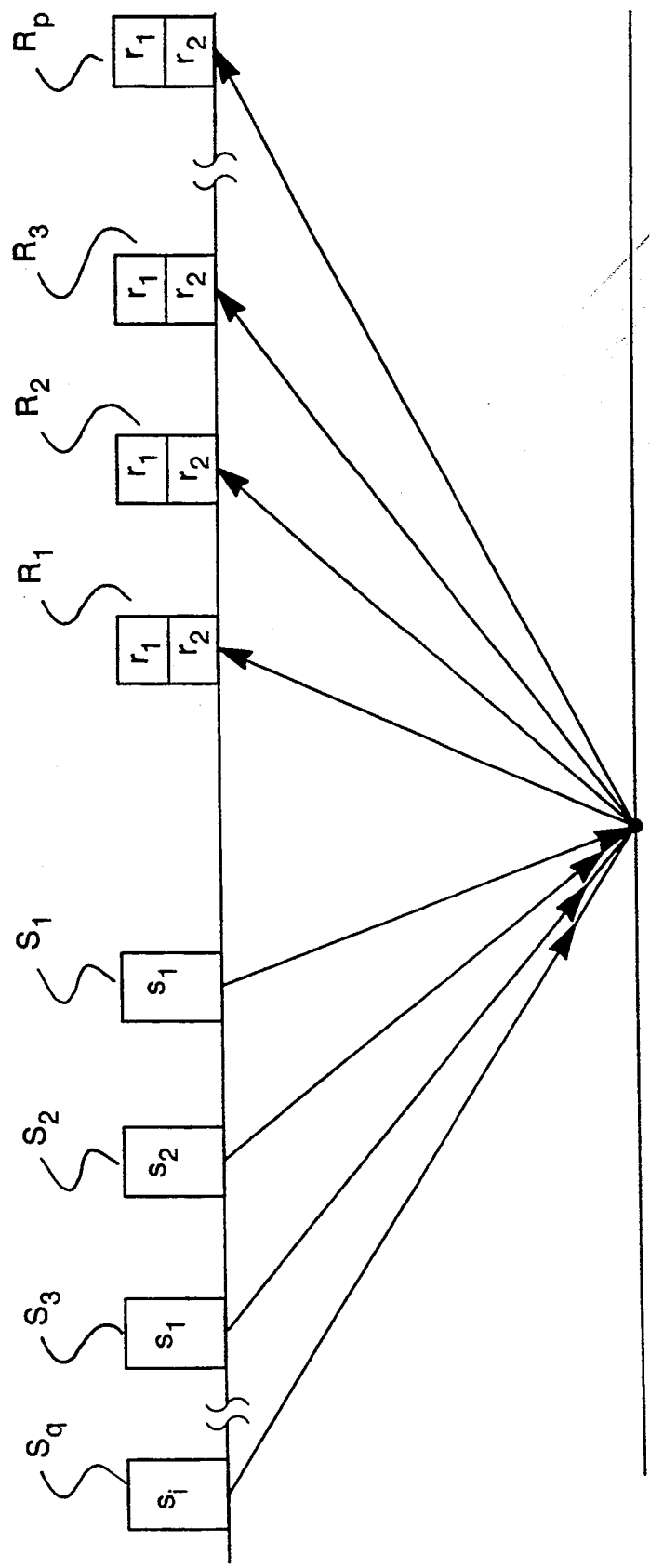
FIG. 10 is a schematic representation of an alternative placement scheme of the elements $r_i$ and $s_j$ in the sets of seismic receivers R and seismic sources S to obtain a concord of seismic signals.

An example of such alternative schemes, FIG. 10 utilizes the same elements $r_i$ in a set of seismic receivers R at the seismic receiver locations $R_p$ as shown in FIG. 2 and 3. However, rather than imparting seismic wave energy at each source location $S_q$ with both elements $s_1$ and $s_2$ in the set of seismic sources S, the seismic wave energy is imparted at every other source location $S_q$ by alternating elements $s_1$ and $s_2$. When the seismic signals $\Phi_{ij}$ are processed for a common depth point, a usable albeit non-ideal, concord of CDP stacked seismic signals K can be obtained (this results from the summation of station locations involved in CDP process). As such, the CDP summation of the seismic signals $(\Phi_{ij})_{pq}$ is now amenable to operation by the operation module A similar decimation on the elements $r_i$ of the set of seismic receivers R can also produce a usable, albeit non-ideal, concord of seismic signals K when processed for a common depth point.

In general, with a seismic signal $\Phi_{ij}$ or some function of the seismic signal $\Phi_{ij}$, e.g., a CDP summation resulting from a set of seismic receivers R having oriented elements $r_i$ responding to a set of seismic sources S having oriented elements $s_j$, the orientation module F can generate synthetic seismic signals $\Phi_{cm}$ having the elements $\bar{r}_c$ and $\bar{s}_m$ with new lines of action by a linear combination of the seismic signals $\Phi_{ij}$. In particular, the synthetic lines of action for the receiver elements $\bar{r}_c$ are a linear combination of the original linearly independent lines of action $r_1$ and $r_2$. The synthetic lines of action for the source elements $\bar{s}_m$ are a linear combination of the original linearly independent lines of action $s_1$ and $s_2$. That is to say, given a complete set of seismic receivers R, the lines of action of the receiver elements $r_i$ can be transformed to a new line of action $\bar{r}_c$ via the receiver operator $C_{ci}$ without having a complete set of source elements $s_j$ and given a complete set of seismic sources S, the lines of action source elements $s_j$ can be transformed into new lines of action $\bar{s}_m$ via the source operator $M_{jm}$ without having a complete set of seismic receivers R.

If the seismic source locations $S_q$ and the receiver locations $R_p$ coincide, and the orientation of the lines of action of receiver elements $r_i$ and the source elements $s_j$ are the same, elastic reciprocity can be exploited to provide redundant seismic signals $\Phi_{ij}$ or to supply missing seismic signals $\Phi_{ij}$ because elastic reciprocity results in the equality that:

$$(\Phi_{ij})_{pq} = (\Phi_{ji})_{qp}.$$

That is, interchanging the locations and the lines of action of the elements $r_i$ and $s_j$ in the set of seismic receivers R and seismic sources S results in the same seismic signal. By extension, it can be demonstrated that in a CDP acquisition technique and with the restrictions that have been enumerated above, the CDP seismic sections $\Phi_{ij}$ and $\Phi_{ji}$ are reciprocal pairs.

In operation, irrespective of the particular placement scheme of the elements $s_j$ and the set of seismic sources S at the elements $r_i$ and set of seismic receivers R, a plurality of concords of seismic signals K can be acquired for selected combinations of the source locations $S_q$ and the receiver locations $R_p$ in a seismic survey E.

In the preferred embodiment, at each source location $S_q$ a shear wave seismic source S, e.g., a shear wave vibrator having a fixed line of action, is employed. By first orienting the seismic source S line of action of the seismic sources in a first orientation with respect to the line of profile of the seismic survey E, seismic energy, such as SH wave, can be imparted into the earth's formation along the first line of action $s_1$. Next, the seismic source S fixed line of action is rotated into a second orientation $s_2$ with respect to the seismic line of profile E and seismic energy, such as SV, is imparted into the earth's formation along the second line of action $s_2$. Here the lines of action $s_1$ and $s_2$ are substantially mutually perpendicular although other orientations can be employed. Additionally, at least two seismometers R are placed at each receiver location $R_p$ and each are adapted to receive different components $r_1$ and $r_2$ of the seismic energy imparted. Here it is preferred that the seismic receivers have (Sh) wave and (Sv) wave lines of action. The lines of action $r_1$ and $r_2$ in the set of seismic receivers R are substantially mutually perpendicular although other orientations can be employed.

Additionally, seismic energy having a compressional (P) wave line of action $s_3$ can be imparted at each source location $S_q$ and the set of seismic receivers R can also include an element $r_3$ for receiving seismic wave energy having a (P) wave line of action at each receiver location $R_p$. Moreover, each element $r_i$ in the set of seismic receivers detects a component of the seismic wave energy imparted by each element $s_j$ in the set of seismic sources.

Regardless of the lines of action selected for the elements $s_j$ and $r_j$ in the set of seismic sources S and seismic receivers R, the seismic survey is laid out on the earth's surface without regard or knowledge of the geologic characteristics of the subterranean formation.

PROCESSING CONCORDS OF SEISMIC SIGNALS

Looking now at FIG. 11, a generalized process flow diagram is shown for operating on a plurality of concords of seismic signals K. Block 100 represents a collection of all seismic signals $(\Phi_{ij})_{pq}$ obtained in a seismic survey for selected combinations of source locations $S_q$ and receiver locations $R_p$. Proceeding to Block 105, the of seismic signals $(\Phi_{ij})_{pq}$ are processed including correlation, filtering, normal moveout correction, etc.

Block 110 is then entered and a decision is made whether to stack the seismic signals $(\Phi_{ij})_{pq}$ before or after the operation of orientation module F. Proceeding first in a direction of a decision of stack before implementing the orientation module F, either block 120A or 120B or 120C is entered. Blocks 120A, 120B, and 120C each represent the different methods of stacking of the seismic signals $(\Phi_{ij})_{pq}$ by way of examples common depth point, common source point and common receiver point, respectively.

Next, the seismic signals $(\Phi_{ij})_{pq}$ are operated on by the orientation module $F_1$. Here the distinction between orientation modules, i.e., $F_1$ and $F_2$, is merely for clarity since both contain the same seismic operators. The orientation module $F_1$ includes a source operator $M_{jm}(t,x)$ designated in Block 140A and a seismic receiver operator $C_{ci}(t,x)$ designated in Block 140B. As previously noted, the seismic source operator $M_{jm}(t,x)$ is a specified vector rotation adapted to transform the linearly independent lines of action of the elements $s_j$ in the set of seismic source S and to synthetic lines of action $\bar{s}_m$ different from that of the elements $s_j$. It is further noted that the seismic source operator $M_{jm}(t,x)$ is time-dependent and spatially dependent; i.e., the source operator $M_{jm}(t,x)$ can produce different vector rotations as a function of time and spatial location. Since the seismic signals $(\Phi_{ij})_{pq}$ are implicitly dependent upon time and spatial location, operation of a time-dependent and spatially-dependent source operator $M_{jm}(t,x)$ can more accurately describe variations in the geological characteristics of subterranean formations which can vary as a function of both depth and spatial location.

Further, the receiver operator $C_{ci}(t,x)$ is a time-dependent and spatially-dependent vector rotation; i.e., the receiver operator $C_{ci}(t,x)$ can produce different vector rotations as a function of both time and spatial location. The receiver operator $C_{ci}(t,x)$ is a specified vector rotation adapted to transform the linearly independent lines of action of the elements $r_i$ of the set of seismic receivers R into synthetic lines of action of the receiver elements $\bar{r}_c$ different from that of the elements $r_i$. Since the seismic signals $(\Phi_{ij})_{pq}$ are implicitly dependent upon both time and spatial location, operation of a time and spatially-dependent receiver operator $C_{ci}(t,x)$ can more accurately describe the variations in the geologic characteristics as a function of depth of the subterranean formation and the spatial location.

Block 140A thus represents a decision whether or not to impress source operator $M_{jm}(t,x)$ on the stack of seismic signals $(\Phi_{ij})_{pq}$. The extent of rotation of the source operator $M_{jm}(t,x)$ is determined in Block 170 and communicated to the orientation module $F_1$. The steps of calculating the receiver operator $M_{jm}(t,x)$ will be discussed later. Regardless of the decision made in Block 140A, Block 140B is entered and a decision is made whether or not to impress the receiver operator $C_{ci}(t,x)$ on the stack of seismic signals $(\Phi_{ij})_{pq}$. The extent of rotation by the receiver operator $C_{ci}(t,x)$ is determined in Block 170 and communicated to the orientation module F. The step of calculating the receiver operator $C_{ci}(t,x)$ will be discussed later.

Hence, the orientation module $F_1$ can produce one of three results: first, the operation of the source operator alone $M_{jm}(t,x)$; second, the operation of the receiver operator $C_{ci}(t,x)$ alone; and third, the combined operation of both source and receiver operators $C_{ci}(t,x)$ and $M_{jm}(t,x)$.

The synthesized stack of seismic signals $(\Phi_{cm})_{pq}$ which have been produced by the orientation module $F_1$ are then directed to Block 150 whereby seismic sections traces can be produced for each of the components in the stack of seismic signals $(\Phi_{ij})_{pq}$; i.e., $\Phi_{11}$, $\Phi_{12}$, $\Phi_{21}$, and $\Phi_{22}$. If the orientation module performs an identity rotation of the seismic signals $(\Phi_{ij})_{pq}$, the concord of seismic sections $\Phi_{ij}$, as shown in FIG. 4, can be thought of as displaying the components of the seismic signals $\Phi_{ij}$ as actually obtained. If, however, the orientation module performs a selected rotation of the stack of seismic signals $(\Phi_{ij})_{pq}$, a synthetic concord of seismic data is produced which can be thought of as displaying the synthetic seismic signals $\Phi_{cm}$. Iterations in the extent of rotation by the orientation module $F_1$ can produce a plurality of synthetic seismic sections having incremental rotations.

Presently a seismologist reviews a plurality of the synthetic concords of seismic data to ascertain which incremental rotation brings into focus the geological characteristics of interest in the subterranean formations. The technique of focusing the seismic energy of the seismic wave so as to enhance the geological characteristics of the subterranean formation can be conceptualized as maximizing the output of the seismic energy imparted into the ground onto various of the synthetic concord of seismic sections.

Now looking at Block 170, calculation means are provided for determining the extent of rotation orientation module F by determining individually the extent of rotation of both the source operator $M_{jm}(t,x)$ and the receiver operator $C_{ci}(t,x)$. Specifically looking at FIG. 12, and iterative process whereby the operators are calculated is shown. FIG. 12 is an expanded flow diagram, detailing the iterative steps of the calculation Block 170 in FIG. 11. Since the calculation of either source operator $M,m(t,x)$ or receiver operator $C_{ci}(t,x)$ includes three independent variables; i.e., time, spatial location and extent of rotation, FIG. 12 discloses an iterative process for calculating the extent of rotation of the operators $C_{ci}(t,x)$ and $M_{jm}(t,x)$ for specified time window $\Delta t$ and a specified spatial location selected in Block 200. That is, the operators $C_{ci}(t,x)$ and $M_{jm}(t,x)$ will operate only over a selected time window $\Delta t$ of the seismic signal $C_{ij}$ for a given spatial location $x_1$.

If the operator $C_{ci}(t,x)$ and $M_{jm}(t,x)$ are assumed not to vary with time; i.e., both operators are constant with respect to time, the time window $\Delta t$ is equal to the record length of the seismic signal $\Phi_{ij}$ and further iterations of time are not considered.

At a given spatial location $x_1$, a first time window $\Delta t_1$ is selected in Block 200, a first extent of rotation of the operators $C_{ci}(\Delta t_1, x_1)$ and $M_{jm}(\Delta t_1, x_1)$ can be calculated as shown in Block 210 and thereafter such extent of rotation is communicated to the orientation module F such that a first concord of synthetic seismic data produced from the seismic signals $\Phi_{ij}$ can be obtained. Next by feedback loop 215, the process of recalculating the extent of rotation operator $C_{ci}(\Delta t_1, x_1)$ and $M_{jm}(\Delta t_1, x_1)$ for a new extended rotation is performed and once again communicated to the orientation module F such that a second concord of synthetic seismic data $A_{ij}$ can be obtained. This iterative process is continued until the operator is able to ascertain which component of the seismic wave has properly focused upon the geological characteristic of interest and the subterranean formation.

Next, a second time window $\Delta t_2$ is selected in Block 220. Thereafter, in Block 230 the step of rotation of the operator $C_{ci}(\Delta t_2, x_1)$ and $M_{jm}(\Delta t_2, x_1)$ is calculated for the time window $\Delta t_2$ and communicated to the orientation module F such that additional concords of synthetic seismic data can be obtained. Further iterations the extent of rotation of operator $C_{ci}(\Delta t_2, x_1)$ and $C_{jm}(\Delta t_2, x_1)$ are communicated by feedback loop 235 similar to the previous discussion.

The process of selecting a time window $\Delta t_n$ and thereafter iteratively calculating the extent of rotation operator $C_{ci}(\Delta t_n, x_1)$ and $M_{jm}(\Delta t_n, x_1)$ and plotting the concords of synthetic data can be contained for as many subdivisions of time as required. Additionally by way of feedback loop 255, the spatial location can be indexed to the next spatial location $X_2$ and the entire process repeated, thus making both operators dependent on both time and spatial location.

Returning now to Block 110 of FIG. 11, a decision not to stack the concords of seismic signals $(\Phi_{ij})_{pq}$ before impressing the operator $C_{ci}(t,x)$ and $M_{jm}(t,x)$ proceeds directly to the orientation module $F_2$. Thereafter the previously discussed operation of the orientation module in cooperation with the iterative process for ascertaining the extent of rotation of the operator $C_{ji}(\Delta t,x)$ and $M_{jm}(\Delta t,x)$ is carried out. In Block 160 the seismic signals $\Phi_{ij}$ which have been processed by the orientation module are displayed as synthetic concords of seismic data. It is to be noted that the resulting synthetic concord of seismic data can either be produced from selected gathers of the seismic signals $\Phi_{ij}$ or alternatively any other mode of gathering the seismic signals $(\Phi_{ij})_{pq}$ such as common depth point, common depth source point, common receiver point, etc.

EXAMPLE 1

The fruits of the present method of acquiring geophysical data and the subsequent processing thereof provides for a myriad of techniques for seismic data enhancement, analysis, display and interpretation. Looking now at FIG. 13, a topographical overview of two different lines of profile $E_1$ and $E_2$ are shown schematically. The line of profile $E_1$ insects the line of profile $E_2$ with an included angle of approximately 60°. These lines of profile were laid out in Dilley, Tex., which was known to contain an azimuthally anisotropic subterranean formation. Moreover, the symmetry planes of such formation were generally aligned perpendicularly to the line of profile $E_2$.

Seismic source locations $S_q$ and seismic receiver locations $R_p$ were laid out along both lines of profile. Superimposed on each line of profile are the lines of action of the source and receiver elements with arrows labeled either 1 or 2. The elements $r_i$ in the set of seismic receivers R were (Sh) wave and (Sv) wave type receivers while the seismic source was a shear wave vibrator having a fixed line of action which was rotated approximately 90° with respect to the seismic line of profile between acquisition cycles to impart either (Sv) or (Sh) wave energy along the lines of profile.

The response to a cross line $s_1$ vibratory displacement of the seismic source S (Sh) wave was recorded into the elements $r_i$ of the set of seismic receivers to sense both the inline (Sv) and cross line (Sh) motion in both lines of profile. This procedure was then repeated with the same source which was rotated approximately 90° with respect to the line of profile so that the motion of the vibrator baseplate was directed in the inline direction $s_2$ to produce (Sv) wave motion. This technique was performed on both lines of profile. This acquisition technique produced a plurality of seismic signals. Common source point gathers of the individual seismic signals $(\Phi_{ij})_{pq}$ were processed and displayed in the form of a concord of common source point gather seismic sections shown in FIGS. 14, and 15 along lines of profile $E_1$ and $E_2$, respectively.

Figures 14A, 14B, 14C, 14D:
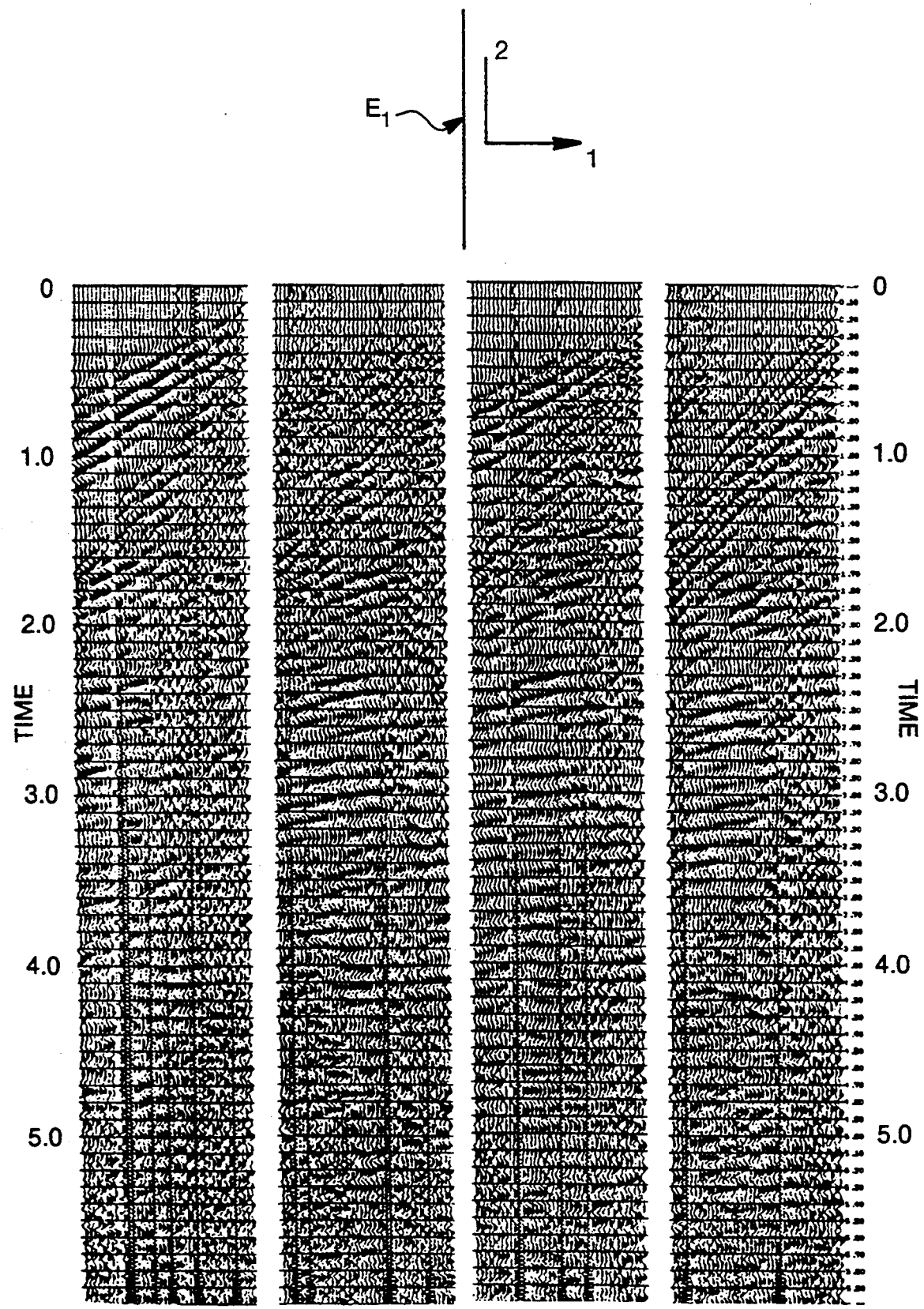
FIG. 14 is a concord of common source point seismic data along line of profile $E_1$.
Figures 14A, 14B, 14C, 14D:
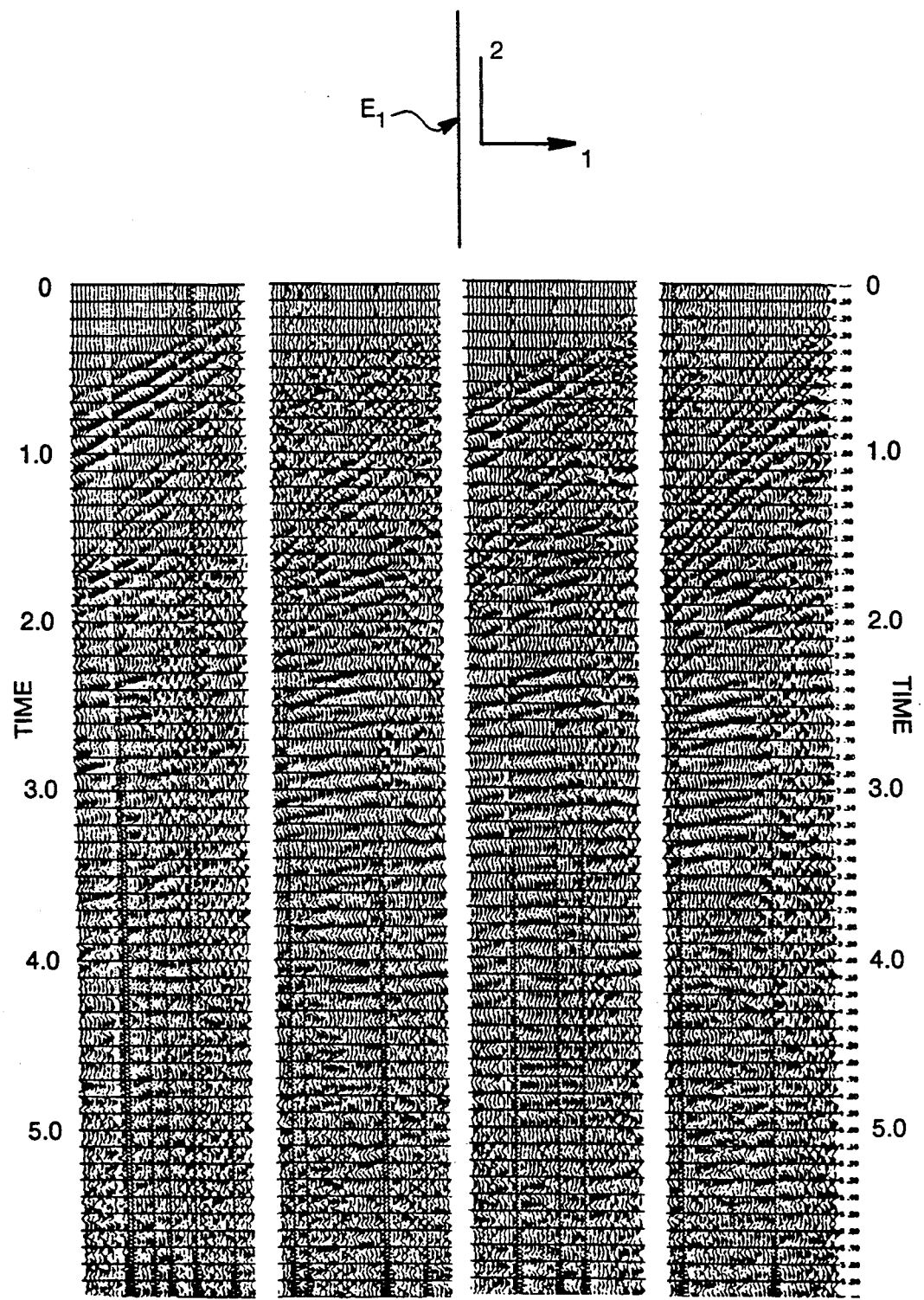

Looking first at FIGS. 14a–d the quality of the concord of CSP seismic data shown thereon, especially FIGS. 14a and d corresponding to seismic signals $\Phi_{22}$ and $\Phi_{11}$ taken along line of profile $E_1$, is uniformly poor and not interpretable since neither seismic line of profile $E_1$ nor the lines of action $s_1$, $s_2$ and $r_1$ and $r_2$ were properly oriented with the inferred symmetry planes of the azimuthally anisotropic subterranean formation. However, the seismic data of FIG. 15a and 15d corresponding to the seismic signals $\Phi_{22}$ and $\Phi_{11}$ taken along the line of profile $E_2$ show good correlation of the seismic events. Recall that line of profile $E_2$ was oriented such that the lines of action $s_1$, $s_2$ and $r_1$, $r_2$ were properly oriented with respect to the inferred symmetry planes of the azimuthally anisotropic subterranean formation.

Figure 13:
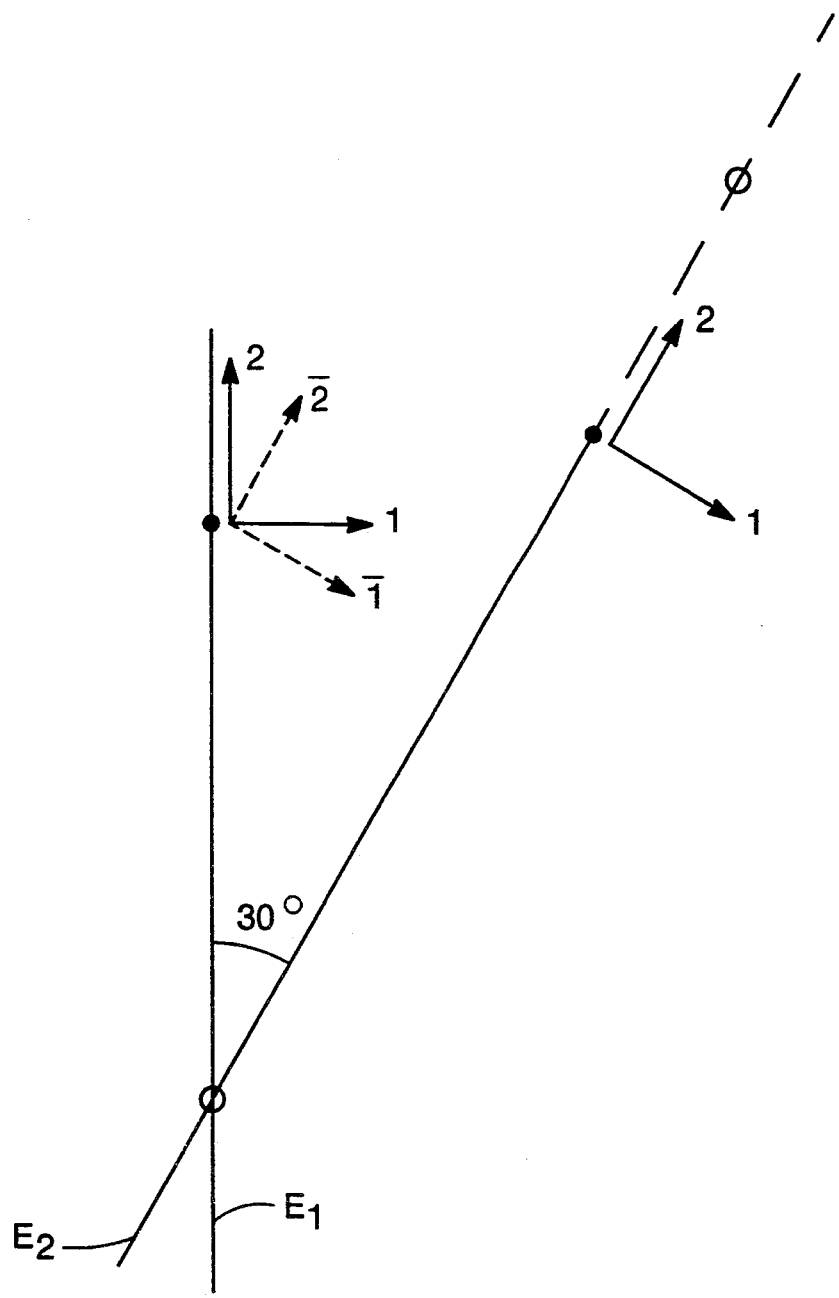
FIG. 13 is a topographical view of the seismic survey lines of profile $E_1$ and $E_2$ and the orientation of the physical lines of action of elements $s_j$ and $r_i$ in the sets of seismic sources and seismic receivers for the field data and synthetic lines of action of elements $\bar{s}_m$ and $\bar{r}_c$.

Now looking at FIGS. 16a–d, a synthetic concord of common source point gathers of seismic data derived from the common source point gathers of the seismic signals $(\Phi_{ij})_{pq}$ along the line of profile $E_1$ now good correlation and interpretability. The synthesized concord of seismic data shown in FIGS. 16a–d are the result of a synchronous rotation of the lines of action of the elements $s_1$ and $s_2$ the set of seismic sources S and of the lines of action of the elements $r_1$ and $r_2$ in the set of seismic receivers R through approximately 30° of rotation. The synthetically rotated lines of action of the elements $s_j$ of the set of seismic sources S and of the elements $r_i$ in the set of seismic receivers R are shown conceptually in FIG. 13 where the rotated lines of action of the elements $\bar{s}_j$ and $\bar{r}_i$ are shown and indicated by the numbered arrows. At the point of intersection of the lines of profile $E_1$ and $E_2$ as shown in FIG. 13, the concord of synthetic seismic data shown in FIGS. 16a–d from the line of profile $E_1$ now match with the physical concord of seismic data in FIGS. 15a–d of the line of profile $E_2$. Thus showing that the lines of action of the elements $s_j$ of the set of seismic source S and the elements $r_i$ of the set of seismic receiver R in the line of profile $E_1$ could have been physically oriented to obtain interpretable information as shown by comparing FIGS. 7 and 16 which were in fact both obtained along the line of profile $E_1$.

EXAMPLE 2

Figure 17:
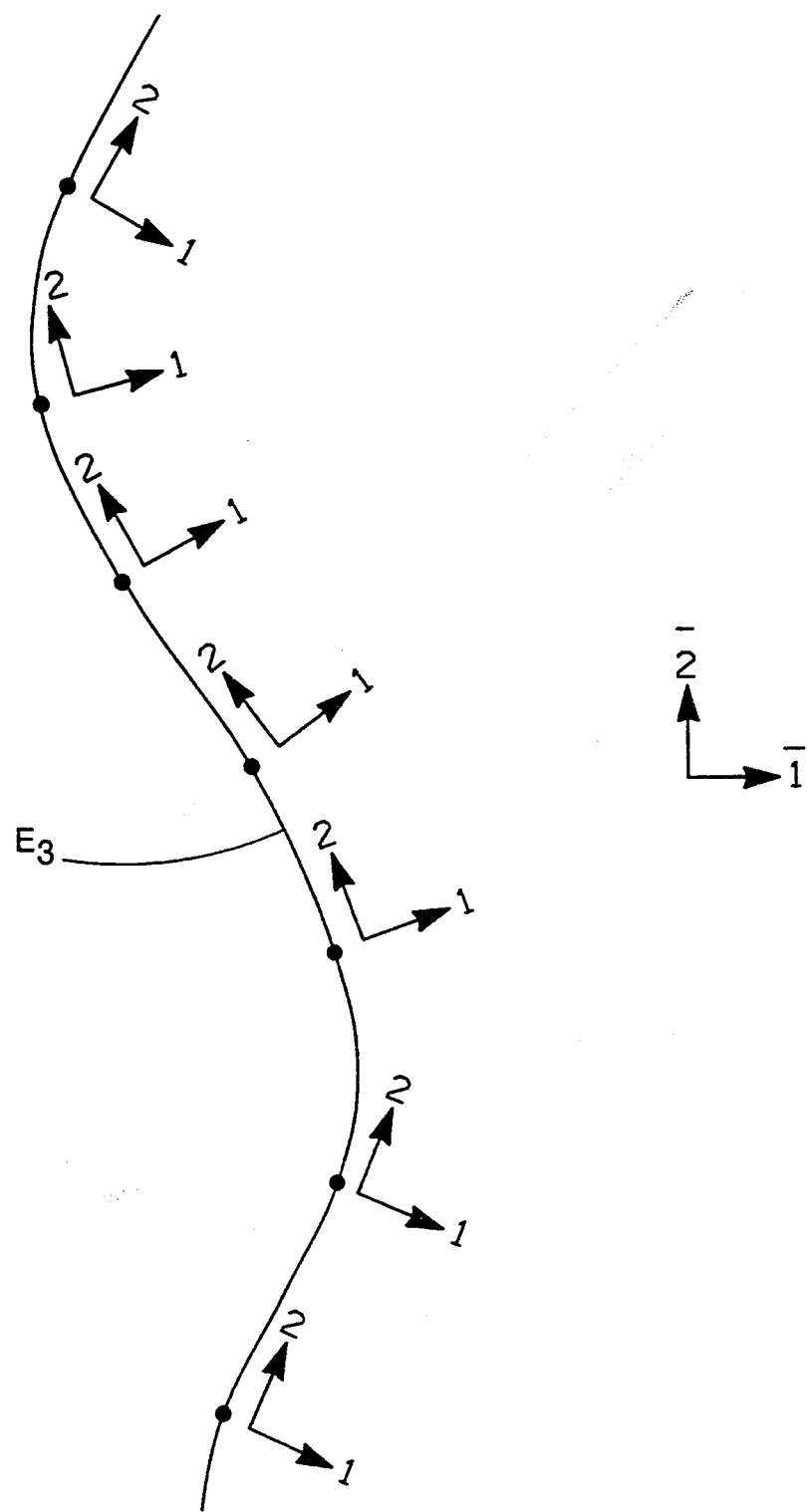
FIG. 17 is a topographical view of a curvilinear seismic line of profile $E_3$.

All prior examples assumed that each seismic line of profile was linear; however, lines of profile are more generally curvilinear as shown in FIG. 17. The seismic line of profile $E_3$ in FIG. 17 can be curvilinear for a number of reasons including surveying errors, avoiding physical objects such as trees, houses, roads, lakes, etc. Nevertheless, the orientation of the elements $r_i$ and $s_j$ of the set of seismic receivers R and seismic sources S are fixed with respect to the seismic line of profile $E_3$ at each source and receiver location $S_q$ and $R_p$ as shown by the arrows numbered 1 and 2. Since the orientation module F includes a spatial dependency, the lines of action of the elements $r_i$ and $s_j$ can be uniformly aligned either relative to the geological character of the subterranean formation or to the horizontal surface of the earth as seen by the arrows numbered $\bar{1}$ and $\bar{2}$.

Since the orientation of the symmetry planes are not known prior to the acquisition and are in fact a reason for the acquisition of a useable concord of seismic signals $(\Phi_{ij})_{pq}$ in the first place, the present method of acquiring geophysical information and the further processing and displaying techniques disclosed herein transforms the otherwise uninterpretable seismic data into a useful form. As described herein, the effect of the operation of the orientation module F is a two-dimensional planar rotation of the lines of action of the elements $r_1$ and $r_2$ and $s_1$ and $s_2$. However, if the elements $r_i$ and $s_j$ have three linearly independent lines of action, the effect of orientation module F is a three-dimensional volumetric rotation of the lines of action $r_1$, $r_2$, $r_3$, and $s_1$, $s_2$, $s_3$.

Moreover, among the infinite choices of rotations which can be impressed upon the concord of seismic signals K by the orientation module F, those skilled in the art can appreciate that other geological characteristics of the subterranean formation can also be inferred or brought into focus so as to aid in the detection as well as the interpretation thereof. Exemplary, but without limitation, the following applications are provided: optimize receiver/source directionality as a function of offset and formation dip; examine the continuous variations of sources from compressional wave to shear wave; discriminate or accentuate compressional events and shear events; correct or extrapolate the effects of range in the presence of azimuthally anisotropic formations; and optimize the source directivity with respect to the resultant received vector amplitude for signal enhancement and information.

As previously noted, the concord of seismic signals K also comprehends utilizing three seismic receivers and seismic sources each having independent, noncollinear lines of action. As presently envisioned, such a concord of seismic signals K could be obtained using mutually orthogonal sets of seismic sources and receivers such as are presently available; e.g., Sh, Sv and P wave sources and receivers. However, the present invention is not limited to the particular line of action of seismic sources and/or seismic receivers presently available. Having disclosed the fundamental concept of the present invention, it will be obvious to those skilled in the art that variations or modifications thereto can be obtained without departing from the spirit of the invention.

I claim:

1. A method for shear wave exploration of the earth's subterranean formations comprising the steps of:
   (a) imparting shear wave energy into the earth's subterranean formations; and
   (b) recording a concord of signals representative of the earth's response to the imparted shear wave energy.

2. A method for shear wave exploration of the earth's subterranean formations including the steps of:
   imparting shear wave energy into the earth's subterranean formations with a source having at least two polarizations; and
   detecting at least two lineally independent components of the shear wave energy imparted by the source in each polarization after the shear wave energy has interacted with the earth's subterranean formations.

3. A system for shear wave exploration of the earth's subterranean formations comprising:
   means for imparting shear wave energy into the earth with a source generating first and second shear waves having first and second polarizations, respectively; and
   means for recording at least first and second components of each of the first and second shear waves and for forming a concord of signals.

4. A method of processing a concord of signals obtained by imparting shear wave energy into the earth with a source having first and second orientations and recording at least first and second components of each of the imparted shear waves with receivers having first and second orientations, comprising the steps of:
   processing the concord of signals to form a synthetic concord of signals with an orientation module for synthetically rotating the first and second orientations of the source and for synthetically rotating the first and second orientations of the receiver.

5. A method of shear wave exploration, employing a source adapted to generate shear wave energy having at least two polarizations and receivers adapted to receive shear wave energy having at least two polarizations, comprising the steps of:
   (a) generating shear wave energy in a first polarization;
   (b) receiving at the receivers the generated shear wave energy in a second and a third polarization;
   (c) generating shear wave energy in a fourth polarization; and
   (d) receiving at the receivers the generated shear wave energy in a fifth and a sixth polarization.

6. A method of processing signals obtained by imparting shear wave energy into the earth with a source having first and second orientations and recording at least first and second components of each of the imparted shear waves with receivers having first and second orientations, comprising the steps of:
   processing the signals with vector rotation operators to form synthetic signals that would have been obtained with a source having third and fourth orientations and receivers having third and fourth orientations.

* * * * *

UNITED STATES PATENT AND TRADEMARK OFFICE
CERTIFICATE OF CORRECTION

PATENT NO. : 5,343,441

DATED : August 30, 1994

INVENTOR(S) : Richard M. Alford

It is certified that error appears in the above-indentified patent and that said Letters Patent is hereby corrected as shown below:

| Col. | Line | | |
|------|------|---|---|
|  |  | in the Abstract, patent reads "earth'subterranean formation" should read --earth's subterranean formation-- | |
| 8 | 9 | "the elements s" should read --the elements $s_j$-- | |
| 8 | 26 | "components s" should read --components-- | |
| 9 | 66 | "seismic sources." should read --seismic sources $S$.-- | |
| 10 | 62 | "elements $\bar{r}$" should read --$\bar{r}_c$-- | |
| 11 | 42 | "FIGS 4a-3" should read --FIGS 4a-d-- | |
| 12 | 44 | "seismic receivers" should read --seismic receivers $R$-- | |

UNITED STATES PATENT AND TRADEMARK OFFICE
CERTIFICATE OF CORRECTION

PATENT NO. : 5,343,441
DATED : August 30, 1994
INVENTOR(S) : Richard M. Alford

It is certified that error appears in the above-indentified patent and that said Letters Patent is hereby corrected as shown below:

| Col. | Line | |
|------|------|---|
| 13 | 56 | "innumerable P alternate" should read --innumerable alternate-- |
| 14 | 4 | "operation module A similar decimation" should read --operation module F. A similar decimation-- |
| 17 | 25 | "seismic data $\Delta_{ij}$" should read --seismic data $\beta_{ij}$-- |
| 18 | 57 | "profile $E_1$ now good" should read --profile $E_1$ now show good-- |
| 20 | 20 | "two lineally independent components" should read --two linearly independent components-- |

Signed and Sealed this

Twenty-ninth Day of November, 1994

Attest:

BRUCE LEHMAN

Attesting Officer     Commissioner of Patents and Trademarks